S. R. HOWARD.
CARTON OPENING AND FEEDING MECHANISM.
APPLICATION FILED DEC. 1, 1917.

1,342,047.

Patented June 1, 1920.
14 SHEETS—SHEET 4.

S. R. HOWARD.
CARTON OPENING AND FEEDING MECHANISM.
APPLICATION FILED DEC. 1, 1917.
1,342,047.
Patented June 1, 1920.
14 SHEETS—SHEET 10.
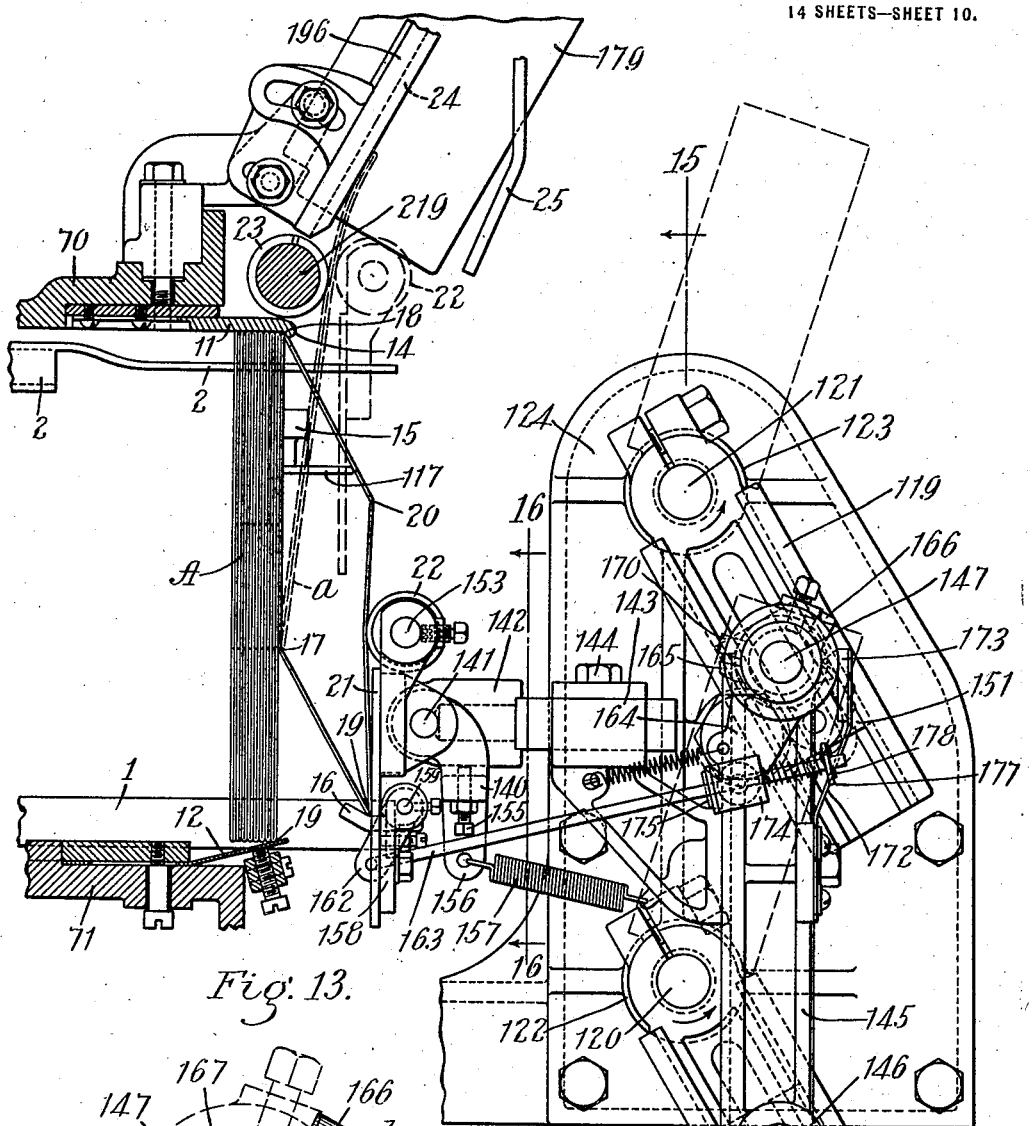
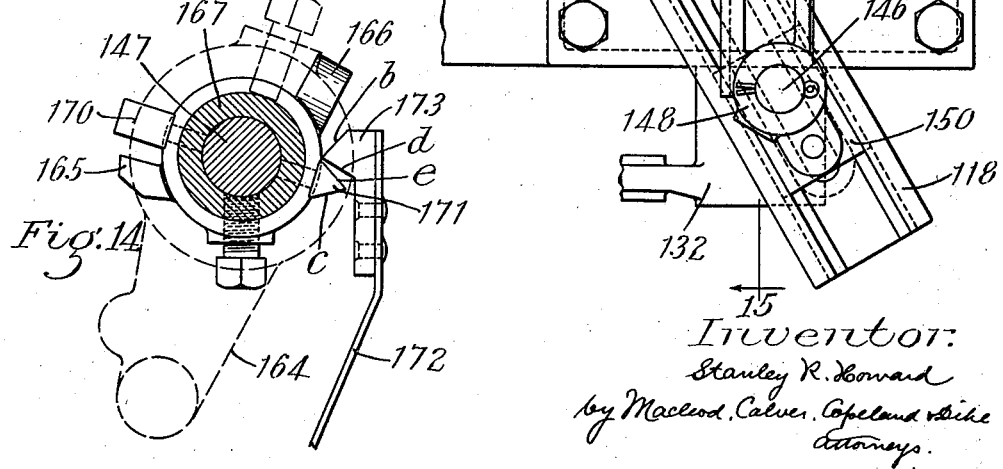

S. R. HOWARD.
CARTON OPENING AND FEEDING MECHANISM.
APPLICATION FILED DEC. 1, 1917.

1,342,047.

Patented June 1, 1920.
14 SHEETS—SHEET 12.

Inventor:
Stanley R. Howard
by Macleod, Calver, Copeland & Dike
Attorneys.

S. R. HOWARD.
CARTON OPENING AND FEEDING MECHANISM.
APPLICATION FILED DEC. 1, 1917.

1,342,047.

Patented June 1, 1920.
14 SHEETS—SHEET 13.

Inventor:
Stanley R. Howard
by Macleod, Calver, Copeland & Dike
Attorneys

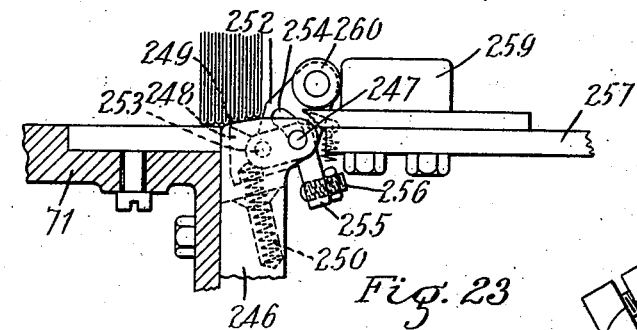
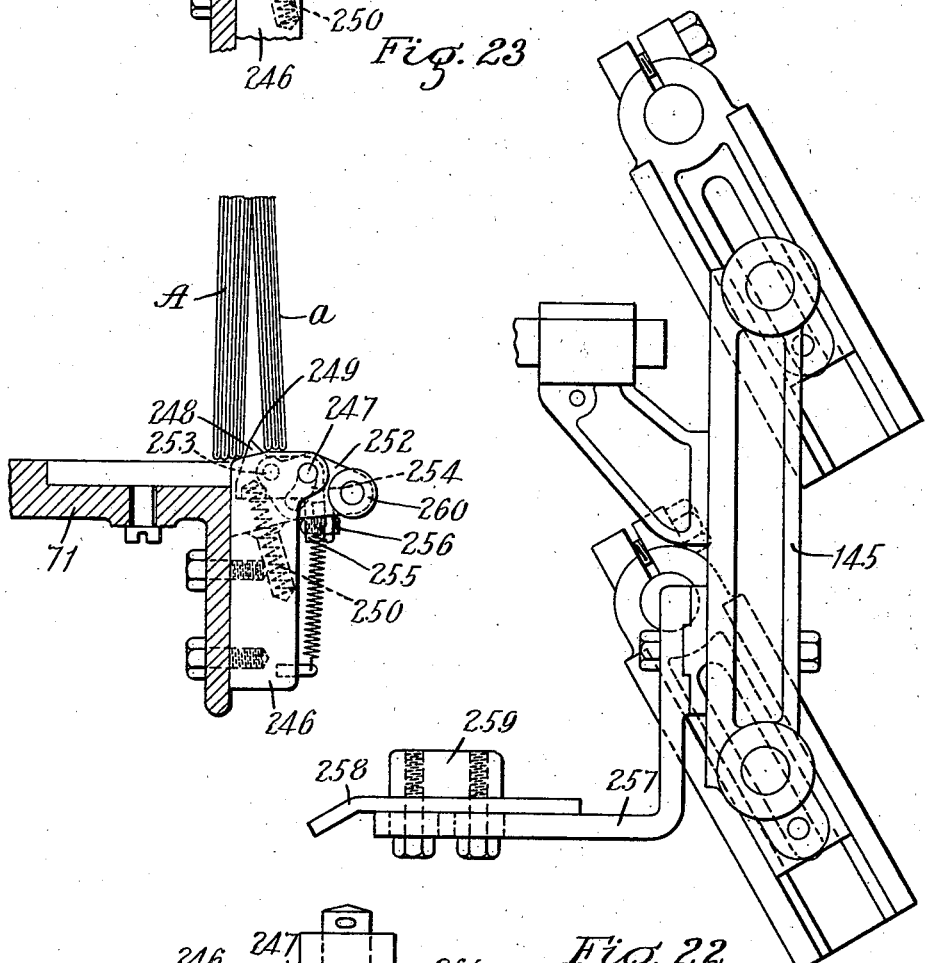
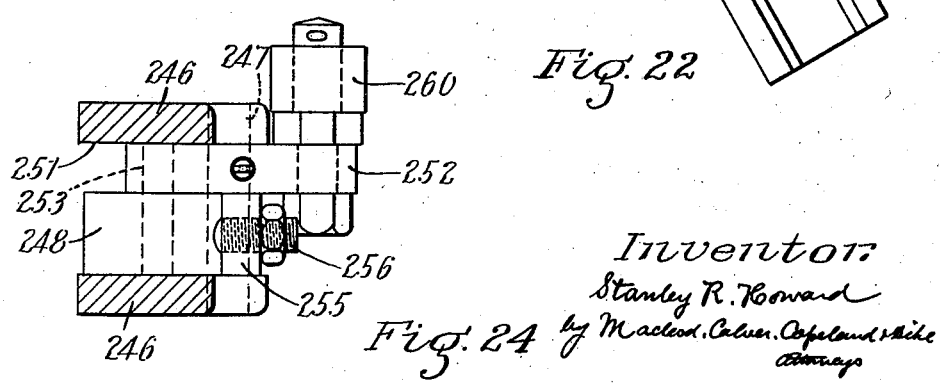

UNITED STATES PATENT OFFICE.

STANLEY R. HOWARD, OF BOSTON, MASSACHUSETTS, ASSIGNOR TO PNEUMATIC SCALE CORPORATION, LIMITED, OF QUINCY, MASSACHUSETTS, A CORPORATION OF MAINE.

CARTON OPENING AND FEEDING MECHANISM.

1,342,047.  Specification of Letters Patent.  Patented June 1, 1920.

Application filed December 1, 1917. Serial No. 204,974.

*To all whom it may concern:*

Be it known that I, STANLEY R. HOWARD, a citizen of the United States, residing at Boston, county of Suffolk, State of Massachusetts, have invented a certain new and useful Improvement in Carton Opening and Feeding Mechanism, of which the following is a specification, reference being had therein to the accompanying drawings.

The invention relates to an improvement in carton blank opening and feeding mechanism. It is especially intended to be used in connection with mechanism for closing and sealing the bottom forming flaps of the carton. The particular style of carton with which it is especially intended to be used is the well known rectangular form of carton in which there are four side panels and top and bottom end forming flaps connected therewith, the blanks first having been scored between the several panels and slit between the end forming flaps to facilitate the folding, one of the side forming panels having a sealing lap connected therewith which laps over on to the adjacent side forming panel and is adhesively connected therewith. In this form, after the side sealing lap has been sealed, the carton can be knocked down flat, two of the side forming panels lying flat against two of the other side forming panels, the end forming flaps being distended in flattened form. This is the form in which empty cartons are usually packed. In this form the cartons are placed on the improved movable support of the present application, whence they are transferred to suitable mechanism which opens and squares out the carton into tubular form preliminary to being slipped upon a forming block where the bottom end forming flaps are folded and sealed.

It has been found that when the knocked down or collapsed blanks prepared as above described are first opened out into the tubular form, there is sufficient back spring in the paper of which the carton is formed, along the four corner edges or scoring lines which mark the division between the several panels, so that there is a tendency of the squared out carton to partially return to its collapsed form.

One feature of the present invention relates to mechanism by which the spring is broken. This is accomplished by opening the carton to a squared out tubular form and then folding it over or recollapsing it in the opposite direction from that in which it was first collapsed; that is, two of the opposite side panels will be swung on their edges as hinges past the right angle position, preferably through nearly 180° with relation to the other two panels which are parallel with each other. This has a tendency to break the spring and then the carton is brought back again to the squared position, at which time the spring will be so broken or weakened that there will be little or no tendency to revert back to the collapsed form.

One feature of the invention relates to the mechanism for changing the blank from the initial collapsed arrangement over to the other collapsed arrangement; another feature relates to the mechanism for a second squaring out of the carton after the spring has been broken; another feature relates to the feeding mechanism for transferring the carton from the reverse collapsing mechanism to the said final squaring out mechanism; another feature relates to the means for spreading the end forming flaps at the top of the carton while the squared out carton is being slipped on to the forming block; another feature relates to the means for feeding the blanks initially to the mechanism which performs the reverse collapsing of the carton. This last mentioned feeding mechanism is the subject of a divisional application Serial No. 269,789, and consists of a reciprocable support or magazine which in preferred form consists of longitudinally reciprocable rails which serve both as a magazine and as a feed to the spreader mechanism. Provision is made by which a large number of blanks may be arranged in a stack on the said rails, the blanks all standing on the rails after the manner of vertical filing instead of being superimposed upon each other and this stack may extend for a length of a number of feet if desired, the rails being of suitable length for that purpose. It is desirable, however, to have a relatively short reciprocating movement of the feed rails, as for instance, a distance of a few inches, sufficient to feed a limited number of cartons, twenty-five for instance, before the rails are moved back preparatory to a new forward movement. The feed rails move forward carrying the row of blanks with them one step at a time equal to the thickness of the space occupied by a blank as often as a blank is removed from the rails by the transfer mechanism which carries it to the opening out mechanism. After the predetermined number of blanks have been taken out one at a time it is necessary that the feed rails should move backward ready for another forward movement. When the feed rails move backward, however, the stack of blanks should not be carried back with it, but should remain with the foremost blank in position to be seized in regular uninterrupted progress by the mechanism which opens it for the spring breaking operation and for carrying it to the squaring out mechanism previously referred to. The backward movement of the said feed rails while the blanks remain in forward position is for the purpose of obtaining a continued step by step forward feed for the blanks and a short length of travel of the rails. In order, therefore, that the stack of blanks may not be carried back with the feed rails, mechanism is provided for automatically relieving the pressure of the stack on the feed rails previous to the retrograde movement of the feed rails and then causing the stack to be redeposited on the feed rails before the feed rails start forward again. The feed rails extend forward a sufficient length so that the blanks will rest on the rails when the stack is redeposited at the end of the retrograde movement of the rails. The preferred method of temporarily relieving the feed rails from the pressure of the stack is to lift the stack from the feed rails, and the drawings show mechanism for relieving the pressure in that way, but it is to be understood that other suitable means for relieving the pressure may be employed and still be within the scope of the invention. Other features of the invention will be set forth hereinafter.

The invention will be fully understood from the following description when taken in connection with the accompanying drawings and the novel features thereof will be pointed out and clearly defined in the claims at the close of this specification.

The drawings, except in some of the detail views, show the parts in position when a blank has been partially opened before removal from the stack.

Fig. 13 is a detail plan view on a larger scale than Fig. 2 showing the mechanism for opening and recollapsing the carton blank after it has been partially opened by the knife.

Fig. 14 is a sectional detail view showing the mechanism for actuating the fingers on the opening plate which engage the side fold of the carton when the fingers are in the position shown in Fig. 13.

Fig. 22 is a detail plan view showing mechanism for separating several of the advance blanks from the others in the stack which may be used in machines when the blanks are made of extra heavy stock and which serve to relieve the pressure of the full body of the stack on the forward stops.

Fig. 23 is a detail view showing the separator of Fig. 22 in its backward position.

Fig. 24 is an elevation of the separator mechanism as shown in Fig. 22.

Figure 19:
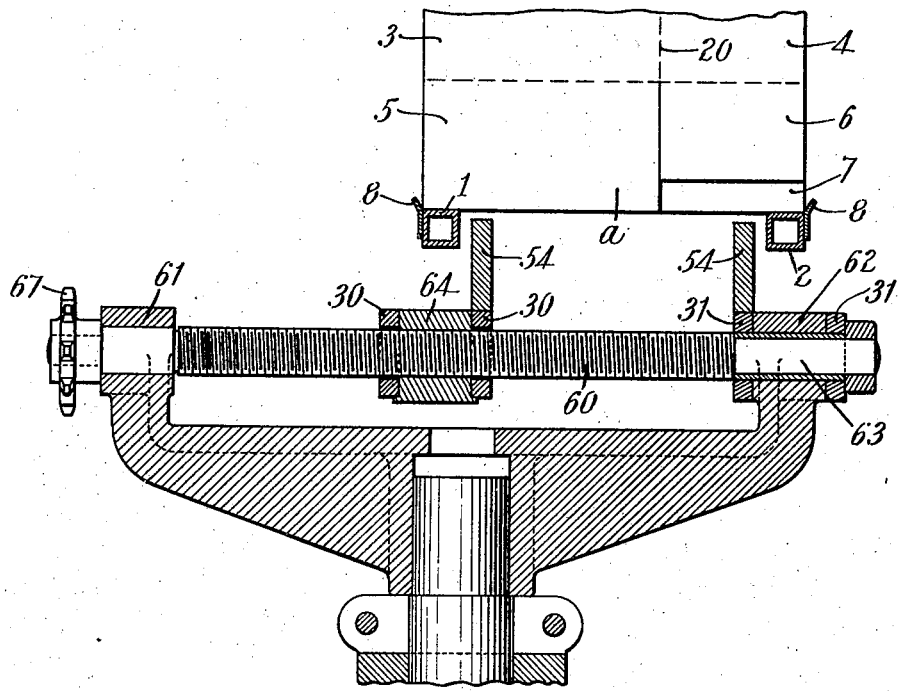
Fig. 19 is a vertical sectional detail on line 19—19 of Fig. 1, showing the feed rails and frame rails and the adjusting mechanism for spacing the frame rails for cartons of different sizes, and showing the carton blank as would be the case if the stack in Fig. 1 extended back beyond the section line.

Referring now to the drawings, A represents a stack of blanks, (see Figs. 1, 2, 5 and 13) the individual blanks being indicated in some figures by $a$, as in Fig. 19. The stack of blanks rests on the longitudinally reciprocable rails 1, 2, which constitute a magazine or stack support and feed, the blanks being stood on end in collapsed form behind one another after the vertical filing system and with the end flaps distended, the bottom forming flaps being at the bottom. In the elevation views shown in Figs. 19, 20 and 21, one of the blanks is shown with its upper part broken away. The carton when opened out is rectangular in cross section, being wider one way than the other, each side being composed of a single panel, and therefore there are two wide side panels and two narrow panels. Correspondingly there are two wide and two narrow end forming flaps at both the top and bottom connected respectively with the side forming panels in the usual manner. The two narrow bottom forming flaps are shorter than the wide bottom forming flaps for a reason which will be hereinafter described. It is to be understood that the invention is equally well adapted for use with cartons in which the four side panels are of equal width, but the form shown is more common, and for convenience of description it is easier to distinguish the parts by referring to two wide panels and two narrow panels. For convenience of reference hereinafter the parts of the blank which will be specifically referred to are designated as follows, (see Figs. 19, 20 and 21.) 3 represents the wide side panel which is at the front, 4 the narrow side panel at the front, 5 the wide bottom end flap attached to the wide rear side panel 3, 6 the narrow end flap attached to the narrow front side panel 4, and 7 is the lower part of the wide end flap back of the narrow end flap 6. The front narrow end flap 6 is made shorter than the wide end flap 7 which is behind it for a purpose which will be hereinafter described. The wide end flap 7 lies partly in back of the wide end flap 5 and partly back of the narrow flap 6. There is another narrow end flap back of the wide end flap 5 which is connected with a narrow side panel in back of the wide panel 3 and there is a wide side panel part of which is back of the narrow panel 4 and part back of the wide panel 3.

The feed rails 1, 2 are preferably made hollow as shown, for lightness. Secured to the outer side of each of the rails 1, 2 is an outwardly flaring flange 8, said flanges 8 serving as guards to hold the blanks on the rails. A weight 9 rests on the rails transversely of the stack and carries a vertical plate 10 which bears against the rearmost blank in the stack to serve as a back stop for the stack. The forward stop, see Fig. 13, consists of two members 12 and 14 which engage two opposite side edges of the foremost blank. One of said members consists of a plate 11 which extends forward from the frame at some distance higher than the feed rail 2 and has a hook 14 which reaches over the side edge 18 of the forward blank and projects a short distance on to the face of said blank, and the other of said stop members consists of a spring plate 12 which extends forward from the frame at some distance higher than the other feed rail 1 at an angle to the plane of the blank so that it not only engages the edge 19 of the blank, but also extends a little bit in front of the blank as shown in Fig. 13. This spring stop 12 has a slight yield and allows the foremost blank to be taken out of the stack at the proper time, in a manner which will be hereinafter described. Preferably there are at least two of these spring stop plates 12, one above the other as shown in Fig. 3.

Figure 3:
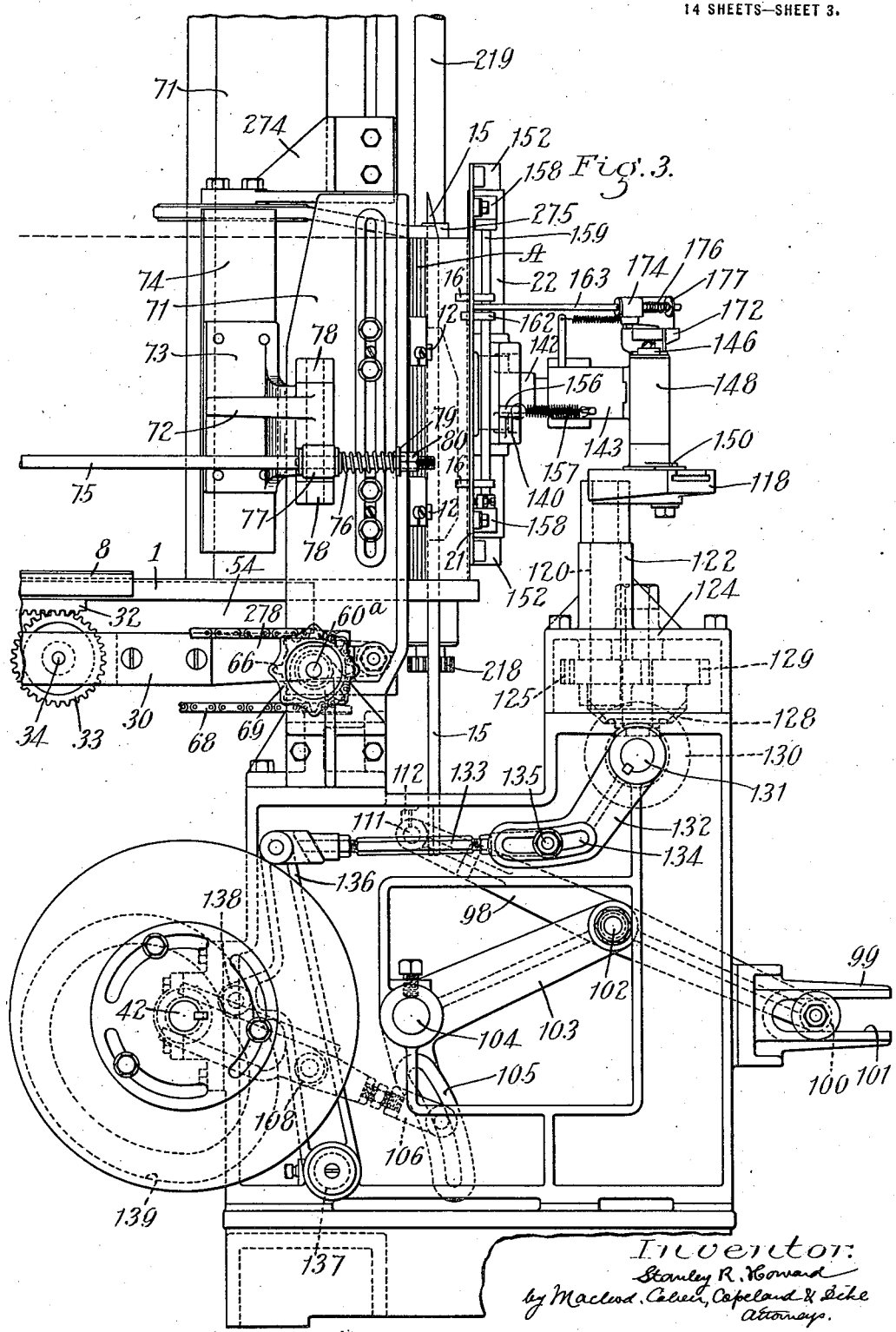
Fig. 3 is a side elevation on a larger scale than Fig. 1, a portion of the rear parts and of the upper part being broken away and the sealing mechanism being omitted.

The foremost blank of the stack is partially spread open by a vertically reciprocable knife 15, see Figs. 3 and 13, which is caused to pass up between the short narrow front flap 6 and the wide rear flap 7, partially opening the blank into the position shown in Fig. 13 and clearing it from the spring stop 12. Then the fingers 16 one above the other (see Fig. 16) carried on an oscillating frame which will be more particularly described hereinafter, engage the side edge of the partially opened blank as shown in Fig. 13, the frame being caused to oscillate, carrying with it the fingers 16 which swing the wide front panel and the two narrow side panels and connected end flaps over from the full line position to the dotted line position shown in Fig. 13, bending the blank on the folding lines 17, 18, 19, 20 which separate the panels. The blank will be swung clear of the hook 14 just before the blank is fully opened in the process of opening and recollapsing.

The oscillating frame which carries the fingers 16 carries also a plate 21 in which is mounted a roller 22 which after the blank has been moved over into the dotted line position shown in Fig. 13 presses the blank against the feed roll 23. Said feed roll 23 draws the blank out of the stack on the feed rails. The blank is thence fed along between two pairs of guide rails, one pair being above the other. One rail of each pair consists of a fixed rail 24 and the other rail of each pair consists of a short oscillatable section 25, at the entrance end, and a stationary section 26 which begins where the oscillatable section leaves off. The purpose of the oscillatable section, which for convenience will be referred to as the movable section is to afford a wide clearance at the entrance as will be described hereinafter. The blank still in the collapsed form passes between the two sets of guide rails into the pocket 27 where it is squared out and thence it is lifted and slipped on to the forming block 28 (see Figs. 1 and 4) as will also be described.

Figure 1:
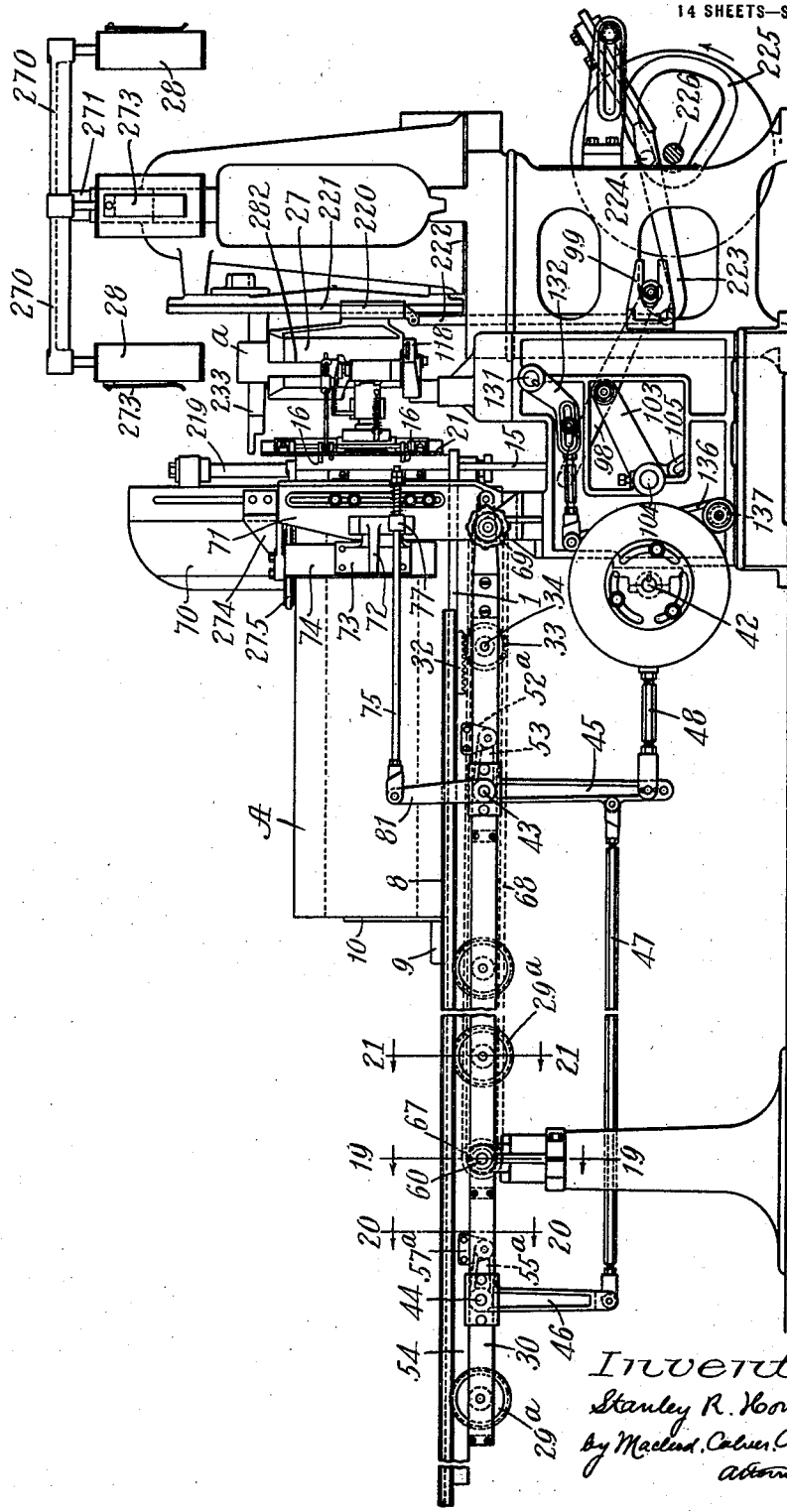
Figure 1 is a left hand side elevation of a machine embodying the invention.

The feed rails and operating mechanism will now be more particularly described. (See Figs. 1, 2, 3, 4, 5, 7, 19, 20 and 21). The feed rails 1, 2 rest respectively on flanged rollers 29ª and 29 each rail being supported on at least two rollers at different points in its length as shown in Fig. 1. The rollers which support the feed rail 1 are located between and are journaled in the frame rails 30, 30, and the rollers which support the feed rail 2 are located between and are journaled in the frame rails 31, 31. See Fig. 21. Each feed rail has attached to the bottom thereof near the forward end a rack 32 (Figs. 5 and 7) and each of these racks meshes with a gear 33 which is keyed to a horizontal shaft 34 journaled in the frame rails 30, 31.

The shaft 34 which carries at its opposite ends the two gears 33 extends for some distance outside of the right hand frame rail 30 as viewed looking toward the rear from the front of the machine, and on its outer end there is mounted a lever 36 which carries a counterweight 37, see Figs. 2, 4, 5 and 7. This counterweight tends to rotate the shaft 34 and gears 33 in a direction to move the feed rails forward. The lever 36 is also pivotally connected to the upper end of a connecting rod 38 which extends downward and at its lower end terminates in a forked casting having two branches 39, 39. This forked casting carries a roll 40 which at certain times in the operation of the machine works in connection with a cam 41 on the cam shaft 42, see Figs. 2, 5 and 7.

Figure 7:
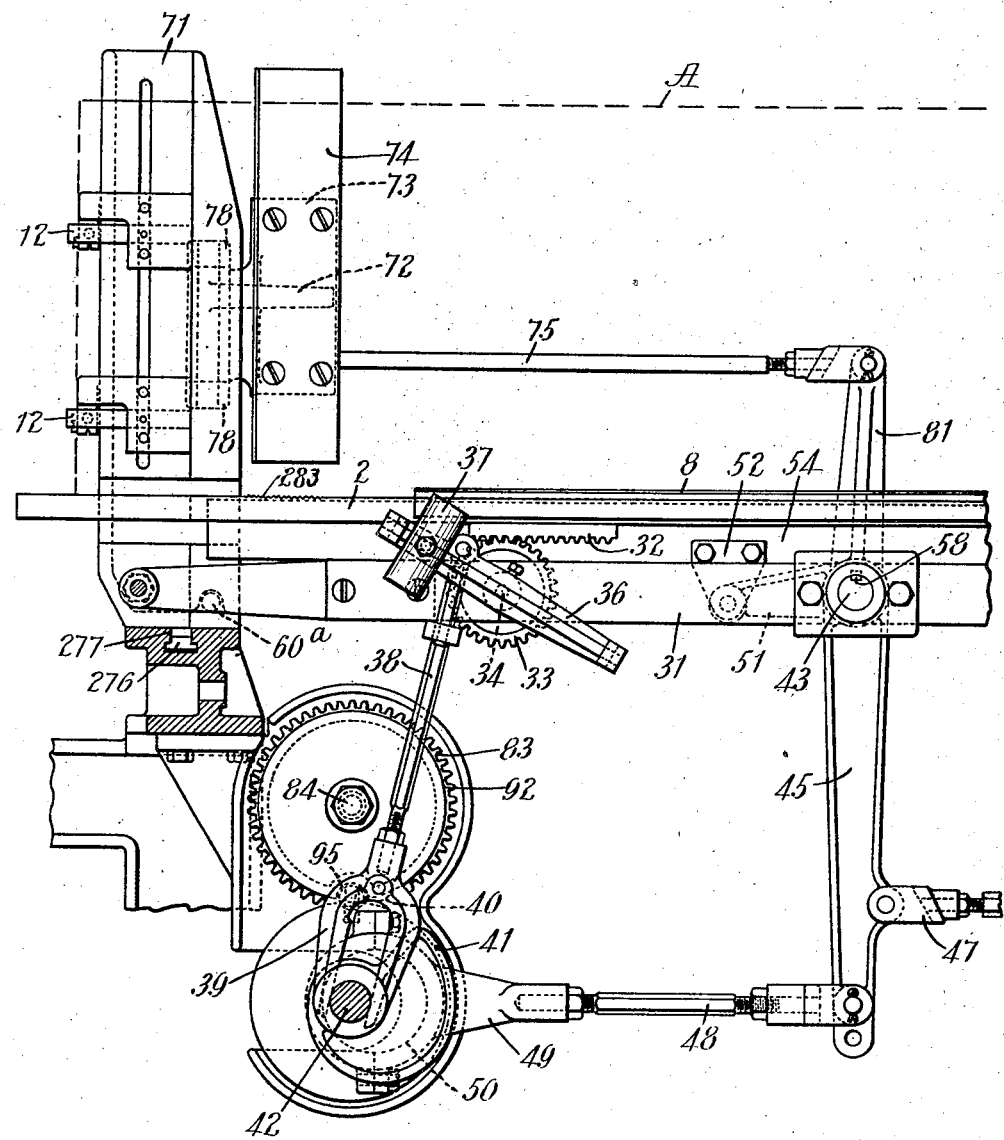
Fig. 7 is an elevation taken on the right hand side of the machine, partly in section, showing in detail the mechanism for operating the feed rails.

The cam 41 is so formed as to move the connecting rod 38 and weighted end of lever 36 upward, and move shaft 34, gear 33 and rack 32 in the reverse direction to that actuated by the weight and thereby move the feed rails 1, 2, backward at each rotation of the cam 41. The arrangement and adjustment are such that the feed rails will have a short range of movement, preferably, about three or four inches. The stack of blanks, as previously stated, rests on the top of the feed rails, standing on end, one blank behind the other in series like the vertical filing system instead of being super-posed upon each other. A weight 9 resting on the feed rails carries the back stop plate 10 and may be placed by hand in position so that the plate 10 will rest against the rearmost blank in the stack. See Fig. 1. The counterweight 37 which is mounted upon one arm of the lever 36 tends to weigh down that end of the lever as shown in Fig. 7 and thereby to rotate the shaft 34 and gears 33 in a direction to move the rack 32 toward the forward end of the machine and thus to move the feed rails forward. This keeps the feed rails as far forward as permitted, the forward end of the stack pressing against the forward stop members 12 and 14 as previously described, and as often as the foremost blank is removed from the stack, the feed rails and whole stack will be moved forward a distance equal to the thickness of the space occupied by the removed blank.

The movement of the rails by means of the rack and gear connection and the shaft, lever and counterweight constitutes the entire mechanism for giving the forward feed of the blanks.

The forward feed of the guide rails by the gear and rack under actuation of the weight 37 which turns the rocker shaft 34 in one direction is not a predetermined exact distance but it depends upon the space occupied lengthwise on the rails by the predetermined number of blanks, that is, twenty-five in number in the machine illustrated in the drawings, which are withdrawn by twenty-five revolutions of the cam shaft before the rocker shaft 34 is positively rotated in a reverse direction to move the rails backward. The distance of the forward feed, therefore, depends upon the thickness of the blanks and how closely they are packed together. The weight 37 has a capacity of giving a forward feed until the weight has swung down into a plumb position unless the reverse movement is given before that time by the withdrawal of the predetermined number of blanks.

Although in the mechanism shown and described the retrograde movement of the rails takes place after a predetermined number of blanks have been taken out, the important feature is merely that the retrograde movement should occur under predetermined conditions so as to avoid a long travel. Any suitable mechanism for accomplishing this comes within the scope of the invention. It may occur after a predetermined number of blanks are removed, or after a predetermined distance of travel or predetermined interval of time, or other predetermined conditions.

Except for the friction of the lower ends of the blanks on the feed rails, 1, 2 the feed rails would make a full uninterrupted forward stroke as far as the actuation by the counterweight 37 is able to carry them, as previously mentioned, and the rails would slide while the blanks remain stationary after the foremost blank bears against the forward stops. The friction of the blanks on the rails, however, prevents such movement of the rails when the foremost blank is engaged by the stops. There is always, however, the tendency caused by the constant pull of the weight to move the rails forward and this causes the foremost blank to press against the stops with a pressure which is always uniform due to the pull of the weight on the rocker shaft. Preferably the feed rails have for a portion of their length, just back of the forward end of the lifting rails, a roughened or toothed portion 283 which serves as a friction surface to engage the lower ends of some of the blanks so as to insure that the feed rails will not slide with relation to the stack on the forward movement.

After a certain number of blanks have been taken out from the forward end of the stack in the process of feeding them to the opening up mechanism, it is necessary to move the feed rails back to the original starting position in order that they may feed forward again and maintain the constant feed. The mechanism for doing this has already been described. The means for controlling the time when the retrograde movement will be given will be described hereinafter. On such retrograde movement it is necessary that the stack should be temporarily freed from the feed rails so that the feed rails will be free to move back without carrying the remaining blanks of the stack with them. This movement should take place at a time when the opening knife 15 is in its downward position and is not inserted into one of the blanks to open it.

The mechanism for lifting the blanks from the feed rails and giving this retrograde movement to the feed rails is as follows: There are journaled in the four stationary frame rails 30, 30, 31, 31, two rocker shafts 43, 44, see Figs. 1 and 7, one of said rocker shafts being toward the forward end of the feed rails and the other toward the rear end of the feed rails. These shafts 43, 44 extend across beneath the feed rails. Mounted on said rocker shafts respectively so as to move therewith are the levers 45 and 46, each of said levers having an arm which extends downwardly, said arms being both connected with a connecting rod 47. The point of connection of the rod 47 with the lever 45 is the same distance from the rocker shaft 43 that the point of connection of the rod 47 with the lever 46 is from the rocker shaft 44. The downward arm of lever 45 has an extension below the point of connection with the rod 47. The lower end of said lever 45 is pivotally connected with one end of a connecting rod 48, the other end of said connecting rod 48 being attached to an eccentric strap 49 which is operated by an eccentric 50 mounted loosely on the cam shaft 42, see Figs. 1, 2, 5 and 7. The eccentric 50 is operated through a clutch mechanism which allows the eccentric to rotate with the cam shaft once for each predetermined number of revolutions of the cam shaft, for instance, once for every twenty-five revolutions of the shaft. See Figs. 8 and 9. The mechanism by which this is accomplished will be described hereinafter. At each revolution of the cam shaft one blank is removed from the stack so that the backward movement of the feed rails occurs after twenty-five blanks have been removed.

The lever 45 is a bell-crank lever having a horizontal arm 51 which lies behind the right hand frame rails 31, 31 and is pivotally connected to a bracket 52 made fast to the right hand lifting rail 54, see Fig. 7. Mounted on the rocker shaft 43 is another horizontal arm 53 (see Fig. 1) which lies between the frame rails 30, 30 and is pivoted to an upwardly extending bracket 52ª made fast to the left hand lifting rail 54.

Figure 20:
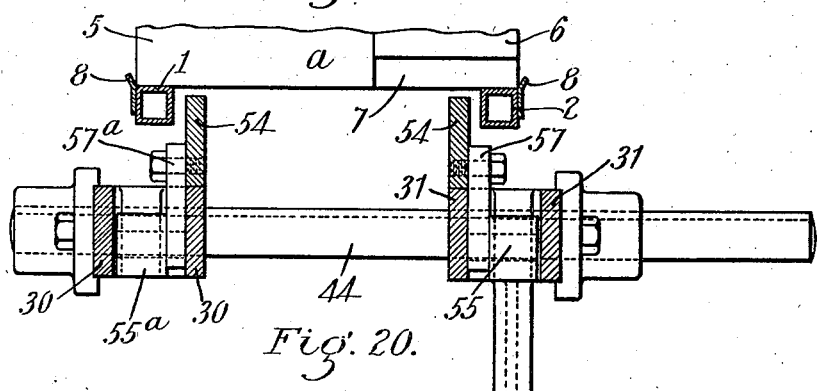
Fig. 20 is a section on line 20—20 of Fig. 1 assuming the stack of blanks to extend back of the section line.

Mounted on the shaft 44 to which the lever 46 is connected are two horizontal arms 55, 55ª (see Figs. 1 and 20). Arm 55 lies between the right hand frame rails 31, 31 and is pivoted to a bracket 57 made fast to the right hand lifting rail 54. Arm 55ª lies between the left hand frame rails 30, 30 and is pivoted to a bracket 57ª made fast to the left hand lifting rail 54. These lifting rails, see Figs. 19, 20 and 21, normally rest upon the top of the frame rails 30, 31, respectively and are between the feed rails 1, 2. When the downwardly hanging levers 45, 46 are moved by means of the eccentric 50 previously described, the two rocker shafts 43 and 44 are rotated equally and together and the forward ends of the horizontal arms 51, 53, 55 and 55ª are moved vertically upward and carry with them in a vertical direction the two lifting rails 54, 54.

The lifting rails 54 are moved upward until the top of each rail comes in contact with the bottom of the stack of cartons A, and then they move still farther upward until they raise the complete stack, together with the weight 9 and back rest 10 sufficiently to remove the stack and the weight from the movable feed rails.

When the feed rails have been lifted, the cam 41 which is mounted on the shaft 42 and rotates in direct connection with the eccentric 50 (see Figs. 5 and 9) comes into contact with the roll 40 mounted on the fork of the connecting rod 38, and the action of said cam on the cam roll 40 is such as to actuate the connecting rod 38 in a manner to rock the shaft 34 in the opposite direction to that in which the rocker shaft has a tendency to move by reason of the counterweight 37, and thereby to rotate the gears 33 in a direction to move the racks 32 and feed rails 1, 2 backward into their rearmost position and to hold the feed rails in that position until the eccentric has turned far enough to have lowered the lifting rails and permitted the stack of blanks and the weight 9 to be deposited again on the movable feed rails. This leaves the stack of blanks in exactly the same position relative to the forward end of the machine as before the feed rails were moved backward. It is obvious that if instead of lifting the stack from the feed rails before the retrograde movement, the feed rails were lowered, depositing the stack on stationary supporting rails leaving the feed rails free to move back and then rise again to receive the stack, such construction would be an equivalent of the mechanism shown and already described.

In order to allow for carbon blanks of different width one whole side of the lifting and feeding mechanism, including one of the movable feed rails, one of the lifting rails and one pair of the frame rails, is adjustable toward and from the opposite side so as to vary the space between the feed rails and between the lifting rails. In the machine shown in the drawings, the movable members are those which are located on the left hand side facing the machine from the front, that is on the left hand side as viewed in Figs. 19, 20 and 21 and right hand side as viewed in Fig. 5. All of the connections and mechanism pertaining to the adjustable feed rail and lifting rail are carried between the two pairs of frame rails so that when one pair of frame rails is adjusted toward or from the other pair of frame rails, all of the mechanism will go with it.

The bell crank lever 45 and the lever 46 are mounted on their respective rocker shafts 43 and 44 by means of feather keys 58 (see Fig. 7) which permit the rocker shafts to slide axially through the levers without interfering with the operative connection of the rocker shaft with the levers. The horizontal arms 53 and 55ª are fast to the rocker shafts 43 and 44 respectively, and will move with said rocker shafts and the movement of these parts is all governed by the movement of the frame rails 30, 30. A feed screw 60 is journaled at its opposite ends in bearings 61, 62 in a bracket forming a part of the frame of the machine, one end of the feed screw having a smooth bearing portion 63 which passes through the fixed frame rails 31, 31 on either side of the bearing 62, the threaded portion of the screw passing through the frame rails 30, 30 and through a nut 64 which is between the two frame rails 30, 30.

In order to insure an even movement of the movable feed rail and the connected parts just above described, it is important that there should be at least two adjusting screws located at different points in the length of the feed rails. The adjusting screw 60 already described is located at a considerable distance toward the rear end of the feed rails. A second adjusting screw 60ª has a smooth portion which is journaled in a bracket 65 on the left hand side of the machine, nearer the forward end of the feed rails, it being on the right in rear elevation as viewed in Fig. 5. The threaded portion of said adjusting screw passes through the lug 64ª on the bracket 71. The bracket 71 has on its lower part a tongue 276 which is slidable in a transverse groove 277 in the frame so that said bracket is slidable transversely toward and away from the bracket 70. An arm 278 fast to the bracket 71 is also fast to the frame rails 30.

By turning the screw 60ª in unison with the screw 60, the bracket 71 is moved one way or the other with the frame rails 30. See Figs. 2, 5 and 7. The inner end of the screw 60ª, does not extend into engagement with the frame rails 31. Mounted on the screw 60ª is a sprocket wheel 66, and mounted on the screw 60 is a sprocket wheel 67. A sprocket chain 68 runs over the said sprockets 66 and 67. The screw 60ª is provided with a hand wheel 69 at its outer end whereby the screw 60ª may be rotated and thereby through the sprockets 66 and 67 and chain 68 the feed screw 60 is also simultaneously rotated. In so doing the frame rails 30, 30 will be moved toward or from the frame rails 31, 31 according to which way the screws are turned, the two frame rails 30, 30 being tied together. Thus the frame rails 30, 30 may be moved toward or from the fixed frame rails 31, 31 as desired and carry with them the interposed brackets 52ª and 54ª and the horizontal lever arms 53 and 55ª and the movable lifting rail 54 which is attached to the brackets 52ª and 57ª. The frame rails 30, 30 will also carry with them the flanged rollers 29ª which lie between the frame rails 30, 30. As the feed rail 1 lies between the flanges of the rollers 29ª, the said feed rail 1 will be moved laterally. The movement of all of the above parts will be as one member.

There is also provided means for alining the stack of blanks on the feed rails up against the inside face of the bracket 70 which rises up at the side of the stack near the forward part of the feed mechanism on the right hand side as viewed facing from the front of the machine, see Figs. 1, 5 and 7. Pivotally mounted in bearings 78 on the bracket 71 on the opposite side of the machine is a bell crank arm 72. One arm of this bell crank is formed with a flat surface 73 at its end to which is attached a steel plate 74 which stands in a vertical position and which is normally held slightly away from the edge of the stack by a connecting rod 75 which passes through an aperture in a boss 77 in the outer end of the horizontal arm of the bell crank 73, see Figs. 1, 2, 3, 5 and 7.

A spring 76 is coiled around the connecting rod 75, one end of said spring abutting against the boss 77, and the other end of the spring abutting against a washer 79 which is held in place by a nut 80 screwed on to the threaded end of the connecting rod 75. The spring 76 is under tension and normally tends to hold the connecting rod and the bell crank 72 in such position as to hold the plate 74 away from the edge of the stack of blanks. The connecting rod 75 is pivotally connected at its other end to the upper end of a vertical arm 81 whose lower end is made fast to the rocker shaft 43, see Figs. 1 and 7. The turning of the rocker shaft 43 when the shafts 43 and 44 rock in a direction to raise the lifting rails 54 will actuate said vertical arm 81 and connecting rod 75 in a direction to move the bell crank lever 72 to bring the steel plate 74 toward the stack, and push the blanks up against the face of the bracket 70. The connecting rod 75 has slightly more movement than is required to move the blanks up against the face of the bracket 70 and the extra amount of movement is taken up by means of the spring 76 on the connecting rod so that the plate 74 is brought up against the stack of blanks with a spring tension. When the rocker shafts 43 and 44 turn in the reverse direction to lower the lifting rails so that the stack of blanks is redeposited on the feed rails, the connecting rod 75 is moved in the reverse direction and thereby causes the steel plate 74 to be retracted from contact with the blanks so not to afford frictional resistance to the feeding of the blanks when the feed rails move forward.

As was previously stated, the feed rails after moving forward a predetermined distance are moved backward. The mechanism for controlling the periodic movement of the feed rails forward and back will now be described, see Figs. 7, 8 and 9. In the mechanism shown the machine is adapted to give the reverse movement at the end of twenty-five revolutions of the cam shaft 42, that is, after twenty-five blanks have been removed from the stack.

Figures 8, 9:
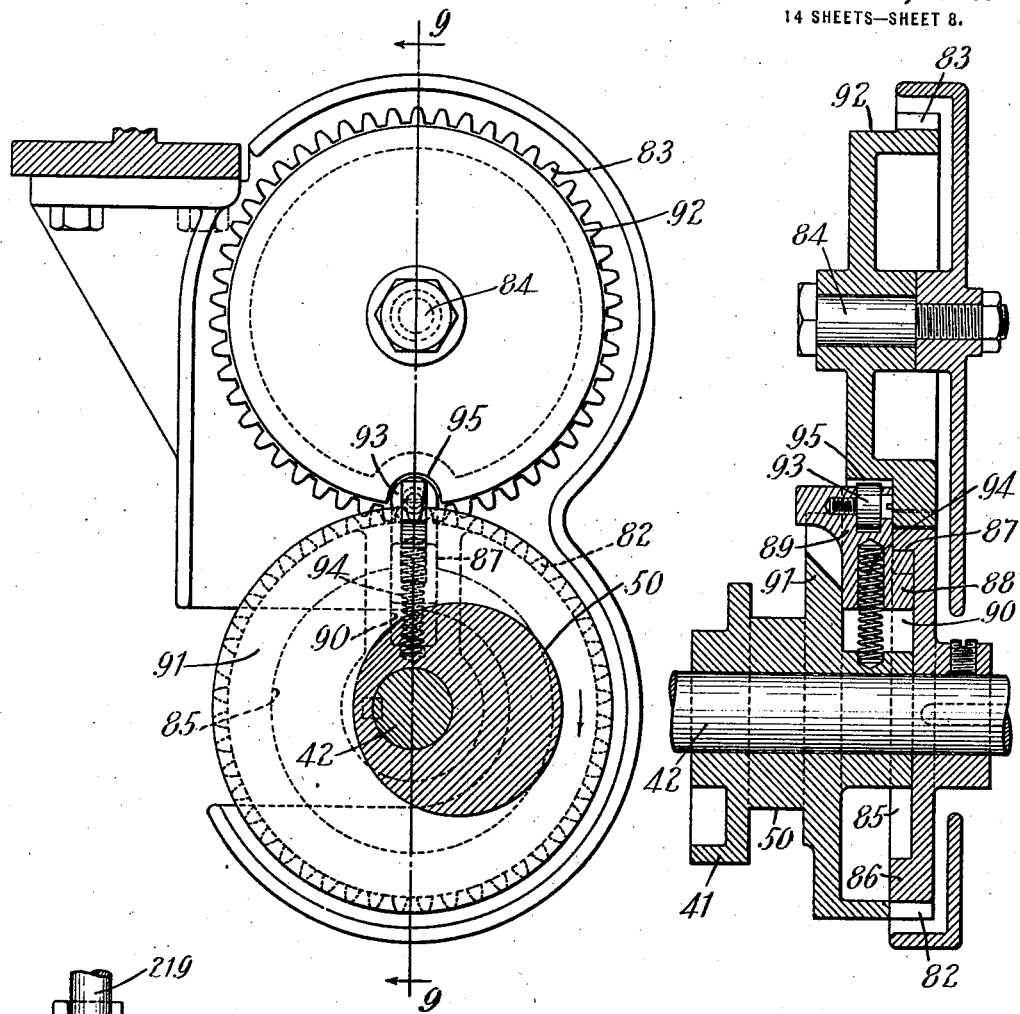
Fig. 8 is a detail view partly in section showing the clutch mechanism and gearing for operating the lifting rails of the blank support to permit the feed rails to be given a return movement.
Fig. 9 is a section on line 9—9 of Fig. 8.
Figure 10:
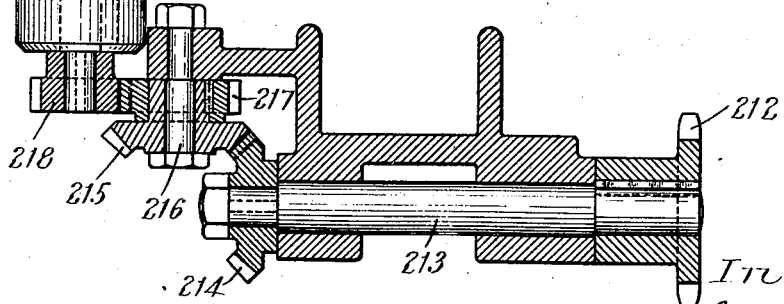
Fig. 10 is a sectional elevation looking from the front of the machine of the driving mechanism for the feed roll.

Mounted on the cam shaft 42 is a gear 82 which meshes with a second gear 83 mounted loosely on a stud 84 carried on a part of the frame of the machine. The gear 82 is formed on one side with a circular recess 85 circumscribed by an annular flange 86 which forms a part of the rim of the gear. The said flange 86 is formed with a notch 87 in its inner periphery with which at a certain time a tooth 88 of the clutch dog 89 is adapted to engage. In Fig. 9 said dog is shown in engagement with said notch. This dog is carried in a slot 90 in a disk 91 which is mounted loose on the cam shaft 42.

The gear 83 is formed with an outside flanged rim 92 which is of sufficient diameter to engage with a roll 93 carried by the clutch dog 89 and hold the tooth of the clutch dog out of engagement with the notch 87 in the driving gear 82. In Fig. 9 the dog is shown as being engaged with the notch 87 in the driving gear. The disk 91 is combined with the eccentric 50 and with the cam 41 which operates the lifting mechanism of the feed rails, see Figs. 5, 7, 8 and 9.

The dog 89 is provided with a spring 94 which has a seat in the hub of the disk 91 and which tends to force the dog outward into engagement with the notch 87 in the driving gear unless the dog is held back with the spring under compression. The rim 92 of the driven gear is formed at one point with a notch 95 adapted to fit the roll 93 carried by the dog, said notch being of such size that when the notch 95 comes into alinement with the clutch dog as shown in Fig. 9, it will allow the spring 94 to push the dog outward from the shaft 42 and cause the tooth 88 of the clutch dog to engage with the notch 87 in the driving gear 82. At this time the roll 93 will just fit in the notch 95 in the rim of the driven gear.

When this last mentioned notch 95 comes into alinement with the roll 93 of the dog and allows the tooth 88 of the dog to engage with the notch 87 in the driving gear the disk 91 which carries the eccentric 50 and the cam 41 will be rotated directly with the driven gear by means of this clutch engagement.

The number of teeth in the two gears 82 and 83 is not equal. In this particular case the driving gear 82 has two less teeth than the driven gear 83, the gear 82 having forty-eight teeth and the gear 83 having fifty teeth. This causes the gears to rotate unequally so that starting with the gears in the position shown in Figs. 8 and 9, with the dog 88 in engagement with the notch 87 of the driving gear and the roll 93 in the notch 95 of the driven gear, then when the clutch disk 91 makes one complete rotation the notch 95 in the rim of the driven gear will not aline with the clutch dog but will be a distance of two teeth away from it. This will bring the rim 92 of the driven gear 83 into engagement with the clutch dog 89 and will depress it into the recess 90, thereby also compressing the spring 94, and thus disengage the clutch and the cam. The rotation of the eccentric 50 and cam 41 will cease until a sufficient number of rotations of the cam shaft have taken place to bring the recess 95 in the driven gear 83 again into alinement with the clutch dog.

In this particular form of construction twenty-five rotations will be required because there are two teeth gained at each rotation and there are fifty teeth in all to be gained.

The mechanism for opening the carton blank from its collapsed form as taken from the stack and folding the side panels over through nearly 180° again into collapsed form will now be described, see Figs. 1, 2, 3, 11, 12 and 13. Fig. 3 is a left hand side elevation at the forward part of the machine, enlarged from Fig. 1. The knife 15 which starts the first opening of the blank preliminary to the said reverse folding operation has a long blade extending vertically upward. See Figs. 3, 12, 13. It is comparatively thin and is preferably about three or four times as wide as it is thick. The knife is held or guided at its upper end in such manner that it can rest back against the front blank of the stack with a light pressure. The guide for this purpose as shown, see Fig. 12, consists of a bracket 96 which is secured to the frame and projects outward transversely of the axis of the knife at one side thereof. The bracket has a finger 97 which extends laterally from the bracket 96 in front of the knife, thus forming a stop which prevents the knife from swinging outward more than a limited distance.

The lower end of the knife 15 is pivotally connected with one end of an arm 98, said arm being a part of a straight line motion mechanism which will be hereinafter described, so that the lower end of the knife travels in a straight line vertically. This straight line motion mechanism is as follows: The other end of the arm 98 from that which is connected with the knife 15 is slidably mounted in a yoke 99, said yoke being so set that the ways 101 in the yoke in which the end of the arm 98 travels are set horizontally. Said arm is provided with a roller 100 which travels in said ways 101. The said arm 98 is pivoted midway of its length to a stud 102 which is carried by the arm 103 of a bell crank lever mounted on a stud 104 fast in the side frame of the machine. The distance from the end of the frame 98 to its pivot point 102 with the bell crank lever is the same as the length of the arm 103 of the bell crank lever to which it is attached. This feature together with the fact that the outer end of the arm moves horizontally in the yoke causes the end of the arm which is connected with the knife 15 to travel in a straight vertical line. The other arm 105 of the bell crank is connected to a connecting rod 106 which has a fork 107 carrying a roll 108 which engages with a cam path 109 on a cam 110 on the cam shaft 42.

Figure 12:
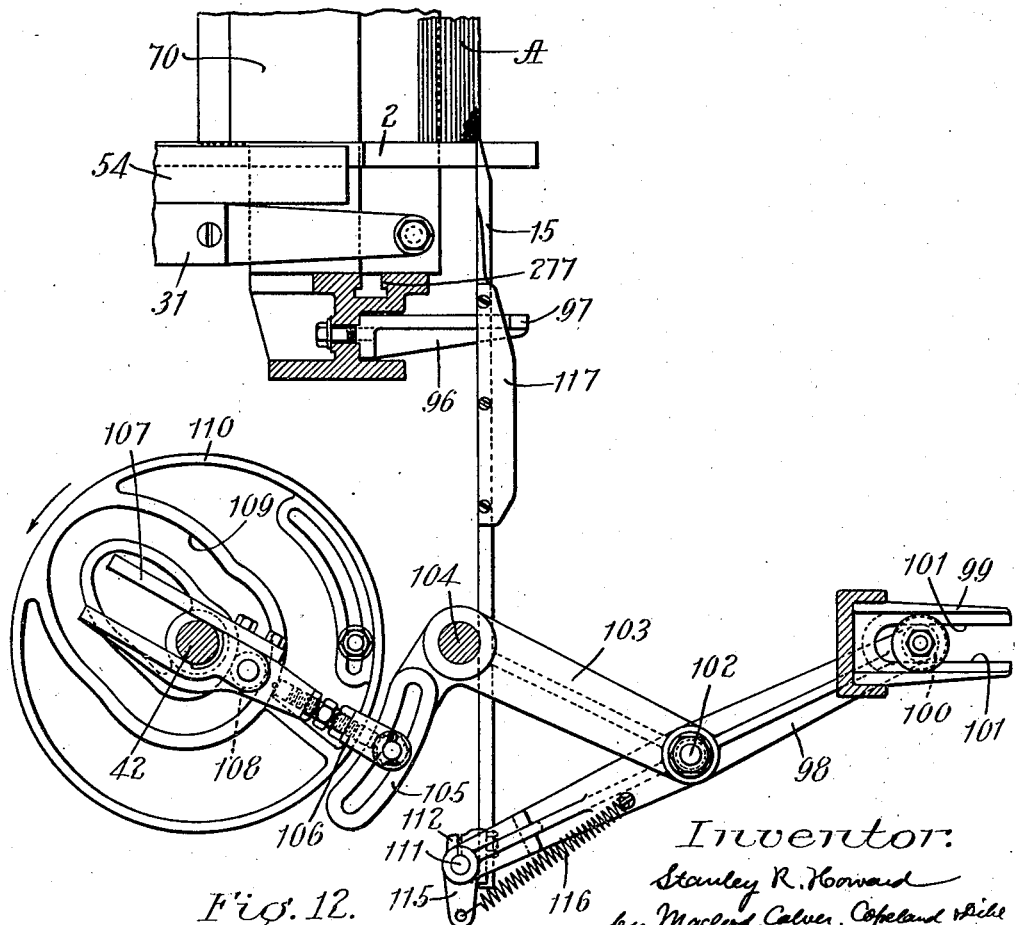
Fig. 12 is a section on line 12—12 of Fig. 11.
Figure 21:
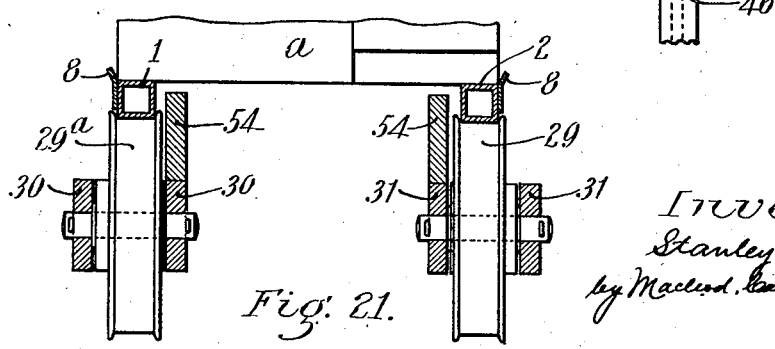
Fig. 21 is a section on line 21—21 of Fig. 1 assuming the stack of blanks to extend back of the section line.

Fig. 12 shows the knife 15 in its lowermost position ready to start upward to open the carton. The lower end of the carton blank is formed with the front narrow flap 6 cut off a little shorter than the wide flap 7 behind it as shown in Figs. 19, 20 and 21. The knife is adjusted so that in its lowermost position, the point of the knife is slightly below the lower end of the narrow front flap 6 but not below the rear wide flap 7 and it presses lightly against the inside face of the rear side flap 7.

Figure 11:
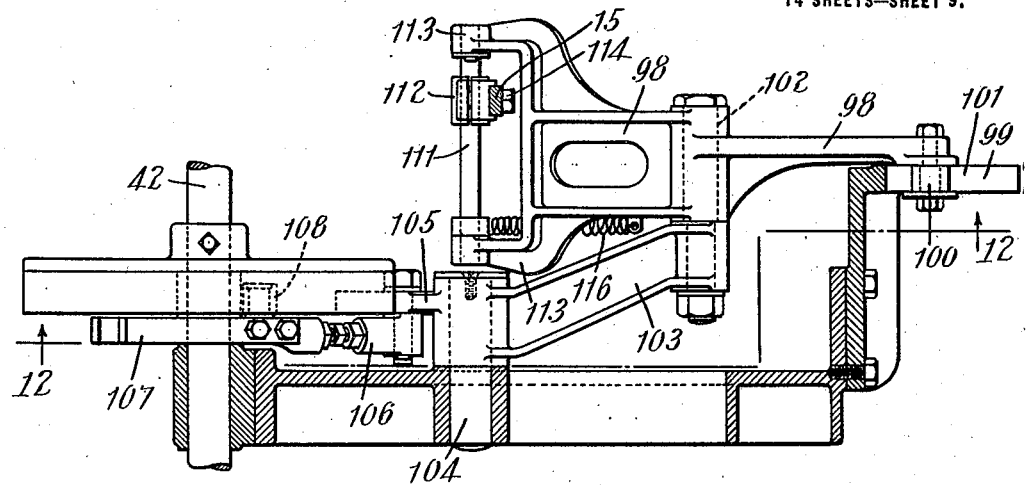
Fig. 11 is a plan view of the mechanism which operates the opening knife.

The knife is adjustable widthwise in relation to the blank and after its adjustment is clamped in its adjusted position. The means for adjustment are shown in Fig. 11. The holding and adjusting mechanism are as follows: A clip 112 is mounted on a shaft 111 journaled in the fork 113 on the end of the arm 98. The knife 15 is clamped to the clip 112 by means of the screw 114 which not only passes through the knife 15 but also through the arms of the clip 112 clamping the said clip to the shaft 111. By loosening the screw 114 the clip 112 may be adjusted on the shaft 111 thereby adjusting the knife 15 widthwise with relation to the blank in the stack. An arm 115 is fastened to shaft 111 having attached thereto one end of a spring 116, the other end of the spring being attached to the arm 98. Said spring is under tension and tends to rotate the shaft in a direction to hold the knife up against the front blank in the stack with a slight tension. When the knife rises the point of the knife goes up into the blank between the two flaps 6, 7 and thence as it goes upward passes between the front panel 4 and the rear panel of the blank and partially opens the blank a distance equal to the thickness of the blade. In order to open the blank a little wider than would be done by the blade itself, there is affixed to one side edge of the blade a plate 117 (see Figs. 12 and 13) which projects a little farther forward than the front face of the blade and is formed with a sloping edge toward its upper end to give a wedge action. This opens the blank a little wider than would be done by the blade alone.

Adjustably secured to a bracket 274 which projects from the right hand side bracket 70 (see Fig. 2) is an arm 275 which extends over the top of the blanks in the front part of the stack just above the upper ends of the blank to prevent the blank from being pushed upward when the opening knife 15 enters the lower end of the carton.

After the blank has been partially opened out by the knife, it is engaged on the left hand side, as viewed facing the front of the machine by other mechanism to further open the blank and then fold it over again on itself on the other side, as referred to earlier in the specification, and it is then fed forward between the guide rails 24 and 25. This mechanism will now be described, see Figs. 2, 13, 15, 16 and 17. Two horizontal oscillatable arms 118 and 119 are mounted in parallel relation to each other respectively on vertical rocker shafts 120 and 121, the connection of the said arms with said shafts being near one end of the arms, see Figs. 2 and 13. Said two shafts are journaled respectively in bearings 122 and 123 which are integral with a casing 124. Said two shafts 120 and 121 are connected together by means of gears in such manner that the arms oscillate through an arc a little less than 180° and are at all times parallel with each other. Mounted on the lower end of the shaft 120 is a gear 125 and mounted on the lower end of the shaft 121 is a gear 126. See Fig. 15. Intermediate between the two shafts 120 and 121 is a stud 127 which carries a combined bevel gear 128 and spur gear 129. The spur gear 129 meshes with each of the gears 125 and 126. The bevel gear 128 meshes with a bevel gear 130 on a horizontal rocker shaft 131 which is journaled in the frame of the machine and carries on its outer end a lever 132. This lever 132 has an adjustable connection with one end of a connecting rod 133. See Fig. 3. Said adjustable connection is produced by forming the lever 132 with an elongated slot 134 with which the end of the connecting rod 133 is engaged by means of a stud 135 and a clamp nut.

The other end of the connecting rod 133 is pivotally connected with one end of a cam lever 136. Said cam lever is fulcrumed at its lower end on a shaft 137 and is provided intermediate its ends with a roller 138 which engages with a cam path 139 in a cam carried on the shaft 42. The cam 139 acting through the cam roll 138, lever 136, connecting rod 133, and other intermediate mechanism described, actuates the oscillating parallel arms 118 and 119 upon the vertical shafts 120 and 121 respectively to swing them through an arc of nearly 180° and back again at each rotation of the cam 139. The cam which actuates the oscillating frame is so constructed and arranged with relation to the other parts that the parallel swinging arms are actuated to operate the mechanism for further opening and recollapsing the blank after the knife has given the blade the initial opening.

A flat steel plate 21 is carried on one end of a yoke lever 140 which is pivoted at 141 on the stud 142 adjustably mounted in a bracket 143 to which it is clamped by a screw 144, see Figs. 2, 13, 16 and 17. This bracket 143 is carried on a link 145. Said link 145 is provided with hubs 148, 149 at its opposite ends by which it is mounted loosely on studs 146, 147. Said studs 146, 147 are fixed in brackets 150 and 151 respectively. Said brackets are adjustably mounted respectively on the two parallel oscillating arms 118 and 119.

Figure 16:
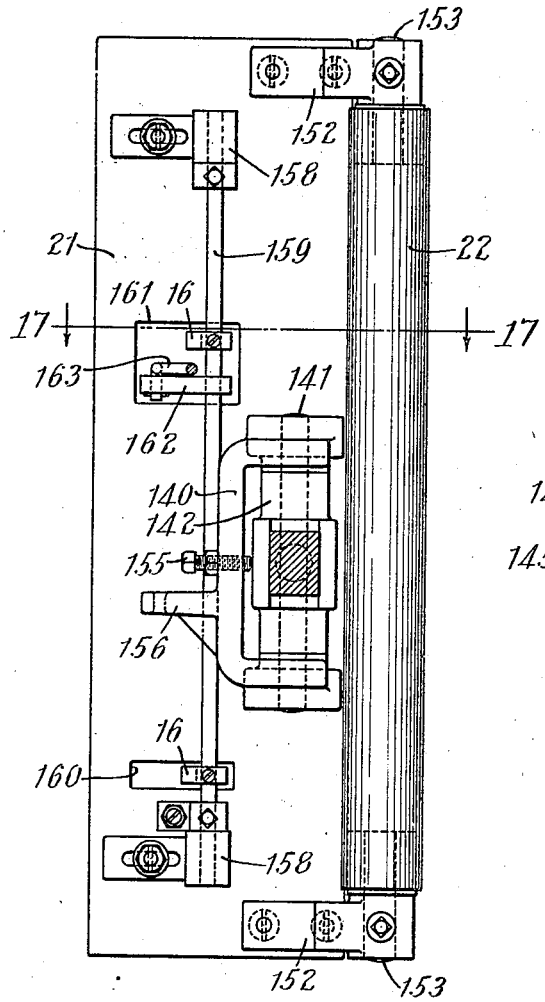
Fig. 16 is a section on line 16—16 of Fig. 13.
Figure 17:
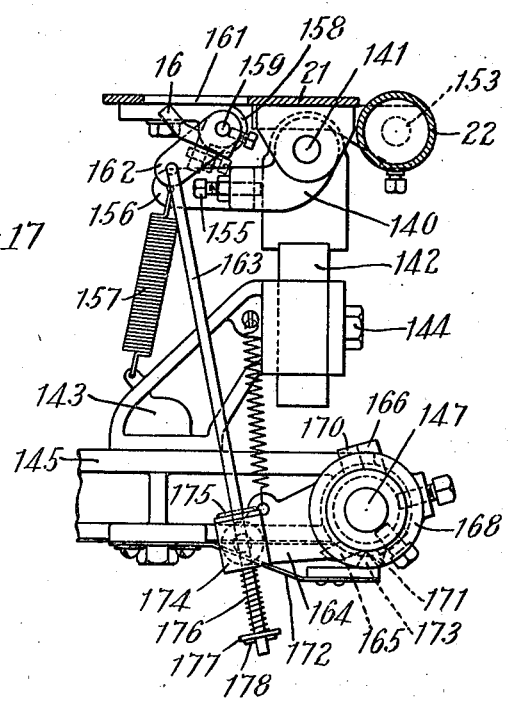
Fig. 17 is a section on line 17—17 of Fig. 16.

The plate 21 and its immediate connections are shown in detail in Figs. 16 and 17. This will be referred to as the opening plate. On one edge of the plate near opposite ends are fastened two bearings 152, 152 which carry pins 153, 153 on which is mounted a hollow steel roll 22 which is adapted to press the carton blank up against the draft roll 23 when the blank has been bent over on itself and is ready to be drawn from the stack.

The yoke lever 140 to which the plate 21 is fastened has a stop screw 155 which bears against one side of the plate stud 142 and acts as a stop to locate the plate in relation to the stud. The yoke 140 also carries an arm 156 which extends outward, see Figs. 16, 17 and 13, and to which is attached one end of a spring 157, the other end of said spring being fastened to the bracket 143 which carries the plate stud 142.

The plate 21 also carries two bearings 158, 158 through which passes a small shaft 159. This shaft 159 carries the fingers 16 which engage the blank at the left hand edge, viewed from the front as in Fig. 13. The plate 21 is formed with openings 160 and 161 through which respectively said fingers 16 move to come into engagement with the edge of the blank and to permit the fingers to be moved back when the shaft 159 is rocked to withdraw the fingers.

The distance from the center of the stud 146 to the center of the shaft 120 on which the arm 118 is mounted is about the same as the width of the narrow panel 4 of the carton, and the distance from the center of the stud 147 to the center of the shaft 121 on which the arm 119 is mounted is the same as the distance from the center of the stud 146 to the center of the shaft 120, so that as the arms 118 and 119 swing from the backward position shown by the full lines in Fig. 13 to the dotted line position the said arms and connecting link 145, bracket 143, stem 142 and plate 21 will all swing together in the arc of a circle.

The two fingers 16, 16 on the rocker shaft 159 are normally held back behind the face of the plate 21 by mechanism which will be hereinafter described and when the swinging arms move from the backward position shown in full lines in Fig. 13, in the direction indicated by the arrows, when the said parts have moved far enough for the plate 21 to come in contact with the face of the blank, the fingers 16, 16 are operated to advance through the openings in the plate and snap around the corner of the blank as shown in Fig. 13. Inasmuch as the distance between the pivot point of the arms 118 and 119 and the studs 146 and 147 respectively is equal to the width of the narrow panel, the plate 21 swings in an arc whose radius is equal to the width of said narrow panel and the fingers 16, 16 which are hooked over the edge of the blank will swing around in the arc of a circle with the opposite edge of the narrow panel as a center to open out the carton blank into square form and then collapse it again.

While the blank is in the stack before it is folded, as you face the blank from the front of the machine, one narrow panel with its connected flaps is at the left in the rear, and one of the wide panels is at the right in the rear, said narrow panel and wide panel being in the same plane. One of the wide panels is at the left overlying the narrow rear panel and overlying a part of the rear wide panel, and the other narrow panel lies in the same plane with the wide front panel and overlies a part of the rear wide panel. When the blank is opened out and is then swung over again into recollapsed position by the knife and by the opening plate as described, the left hand narrow panel which was in the rear, will be swung over on to the front face of the rear wide panel and the right hand narrow panel which was in front, will be swung over until it lies in the same plane with the rear wide panel, the rear wide panel remaining stationary, and the front wide panel will be swung over until it again comes back against the face of the rear wide panel and also against the face of the right hand narrow panel and in the same plane with the left hand narrow panel, which, as stated, is now also in front of the rear wide panel. During this time the rear wide panel will remain stationary. The recollapsed blank will be pressed against the draft roll 23 by the idler roll 22 carried on the spreader plate 21.

The mechanism for controlling the operation of the fingers 16, 16 to move at the proper time in and out through the openings 160 and 161 in the plate 21 is as follows. Attached to the rocker shaft 159 which carries said fingers 16 is an arm 162 the other end of said arm being pivotally connected with a connecting rod 163 which goes back to the lever 164 which operates the fingers. See Figs. 2, 13 and 17.

Figure 15:
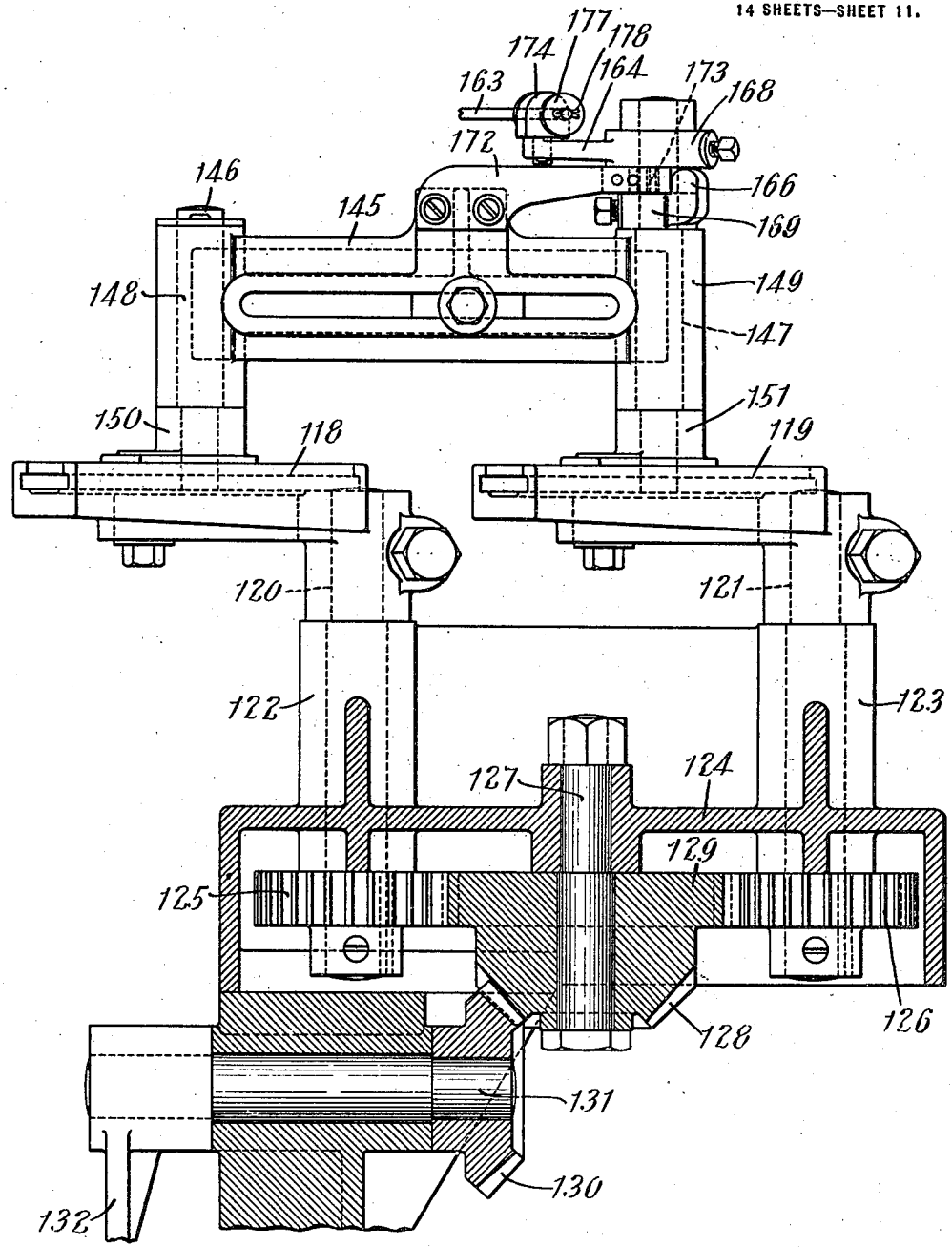
Fig. 15 is a section on line 15—15 of Fig. 13.
Figure 18:
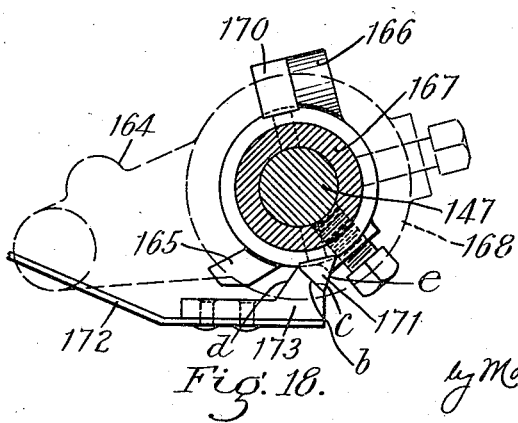
Fig. 18 is a sectional detail view showing the mechanism of Fig. 14 for actuating the fingers on the opening plate when the said fingers are drawn back out of the slot in the opening plate as shown in Fig. 17.

Mounted fast on the stud 147, which is one of the studs that carries the link 145 on which the plate bracket 143 is mounted, is a casting 169 with two lugs 165 and 166 (see Figs. 14, 15 and 18.) Mounted loosely on the shaft 147 just above this casting is a sleeve 167 which is turned down to receive the hub 168 of the lever 164. The sleeve 167 is of two diameters and has extending from its larger diameter, that is, the portion which is shown in Fig. 15 between the arm 164 and the casting 169, two pins 170 and 171. The pin 170 is rectangular in section as shown in Figs. 14 and 17 and the pin 171 is pointed. Mounted on the link 145 is a flat steel spring 172 which carries at its outer end a steel piece 173 which is pointed corresponding with the pointed pin 171. One end of the arm 164 carries a swivel connection 174 (see Figs. 13, 15 and 17) through which the connecting rod 163 passes. This connecting rod is held in the swivel by means of a pin 175 which passes through the connecting rod on one side of the swivel and on the other side is a spring 176 which is held with a tension on the rod 163 by a washer 177 which abuts against a pin 178. This gives a slight spring action to the connecting rod 163 and arm 162 on one side of the throw. (See Fig. 17.)

In Fig. 14 the mechanism for operating the fingers is shown in the same position as in Fig. 13 but on a larger scale. Fig. 18 shows the mechanism in the opposite position to that of Fig. 14, the position in Fig. 18 being that in which the fingers 16 are drawn back through the slots in the plate 21. Fig. 17 also shows the parts in the same position as Fig. 18.

In Figs. 14 and 13 the mechanism is shown in the position where the fingers 16 are engaged with the folded edge of the carton blank. Consider now that the plate 21 has moved around from the position shown in Fig. 13, in full lines, to the position shown in dotted lines, having opened the carton and recollapsed it, just about in a position to press the blank against the feed roll 23 and draw it from the stack. The stud 147 on which this mechanism is mounted is fastened rigidly in the arm 119 and rotates in relation to link 145 as the arm 119 swings around in its movement about the stationary shaft 121. This rotation of the stud 147 relatively to the link 145 causes the casting 169 with the lugs 165 and 166 to rotate counter clockwise, the casting being fastened to the stud 147, until the lug 166 comes around into engagement with the pin 170 which is fast to the sleeve 167. This engagement will take place just before the stud 147 and the swinging arm 119 have completed their movement. The last part of the movement of the arms and the stud 147 causes the lug 166 to press against the pin 170 and thereby to start the rotation of the sleeve 167 in which the pin 170 is mounted. This rotation of the sleeve causes the pin 171 to press against the side of the tapered member 173 carried on the spring 172, and on account of the pin 171 and member 173 both having inclined faces which engage each other, the spring 172 will be bent backward until the point of the pin 171 is in contact with the point of the member 173. A slight further movement of the sleeve 167 will cause the point of the pin 171 to ride past the point of the member 173, and the spring 172 will then spring in again to its normal form carrying the member 173 in a direction toward the sleeve 167. As the inclined face b on the outer end of the member 173 presses on the inclined back c of the pointed lug 171, on said return movement of the spring 172, the pressure of the spring, acting through said inclined faces of the member 173 and pin 171 by a sort of cam action will cause the sleeve 167 to rotate slightly further until the sleeve is in the position shown in Fig. 18. Now, since the lever 164 is mounted fast on the sleeve 167 which carries the two lugs 165 and 166, this movement of the sleeve will carry with it the lever 164, and through the operation of the connecting rod 163, it will move said rod 163 and with it the arm 162 to which the finger shaft 159 is made fast, thereby drawing the fingers 16 back through the openings 160 and 161 respectively of the plate 21 into the position shown in Fig. 17.

Upon the return movement of the parallel swinging arms 118 and 119, the reverse movement of the casting 169 carrying the lugs 165 and 166 will take place, carrying the parts back into the position shown in Fig. 14. The lug 165 will come in contact with the pin 170 and at the last part of the movement it will move the sleeve 167 in a direction clock wise as viewed in Figs. 14 and 18 and the pin 171 will again engage the inclined end of the member 173 until the point of the pin 171 rides past the point of the member 173; then the inclined inner face d of the member 173 will act upon the inclined face e of the pin 171, being forced down by the pressure of the spring 172, thus causing the sleeve 167 to make still further slight movement in said clock wise direction. This will move the lever 164 in the reverse direction also, and acting through the connecting rod 163 will turn the lever 162 in a direction to move the fingers 16 again forward through the opening in the plate 21, ready to engage the corner of the next blank as it is fed out of the stack.

The guide mechanism which receives the blank from between the roll 22 and the feed roll 23 will now be described, see Figs. 2, 4, 6, 10 and 13.

The guide mechanism consists of two sets of rails, an upper and a lower set, the upper set consisting of a rail 24 which is fixed throughout its length, and another rail consisting of an oscillating section 25 at the entrance, and a stationary section 26 parallel with the rail 24, the passage between said rails leading to the pocket 27 as previously described. The stationary rail section 26 is adjustably mounted in a bracket 182. The upper set of rails is shown in plan view in Fig. 2. The lower set of rails is similar to these upper rails and some distance below them, and beneath the lower set of rails is a bed plate or table 179 upon which the lower end of the blank slides as it is passed along between the guides. See Figs. 4 and 6. The swinging section 25 which will be referred to as the movable section is pivoted on a bracket 180 and is adapted to be moved away from the opposite fixed rail when the blank is being fed between the idler roll 22 and the feed roll 23. See Figs. 2 and 6. After the blank has been fully fed from between the two rolls 22 and 23, the said movable rail 25 is swung into a position so that the swinging end of the rail, that is, the end at the entrance moves into contact with the fixed rail 24.

Figure 2:
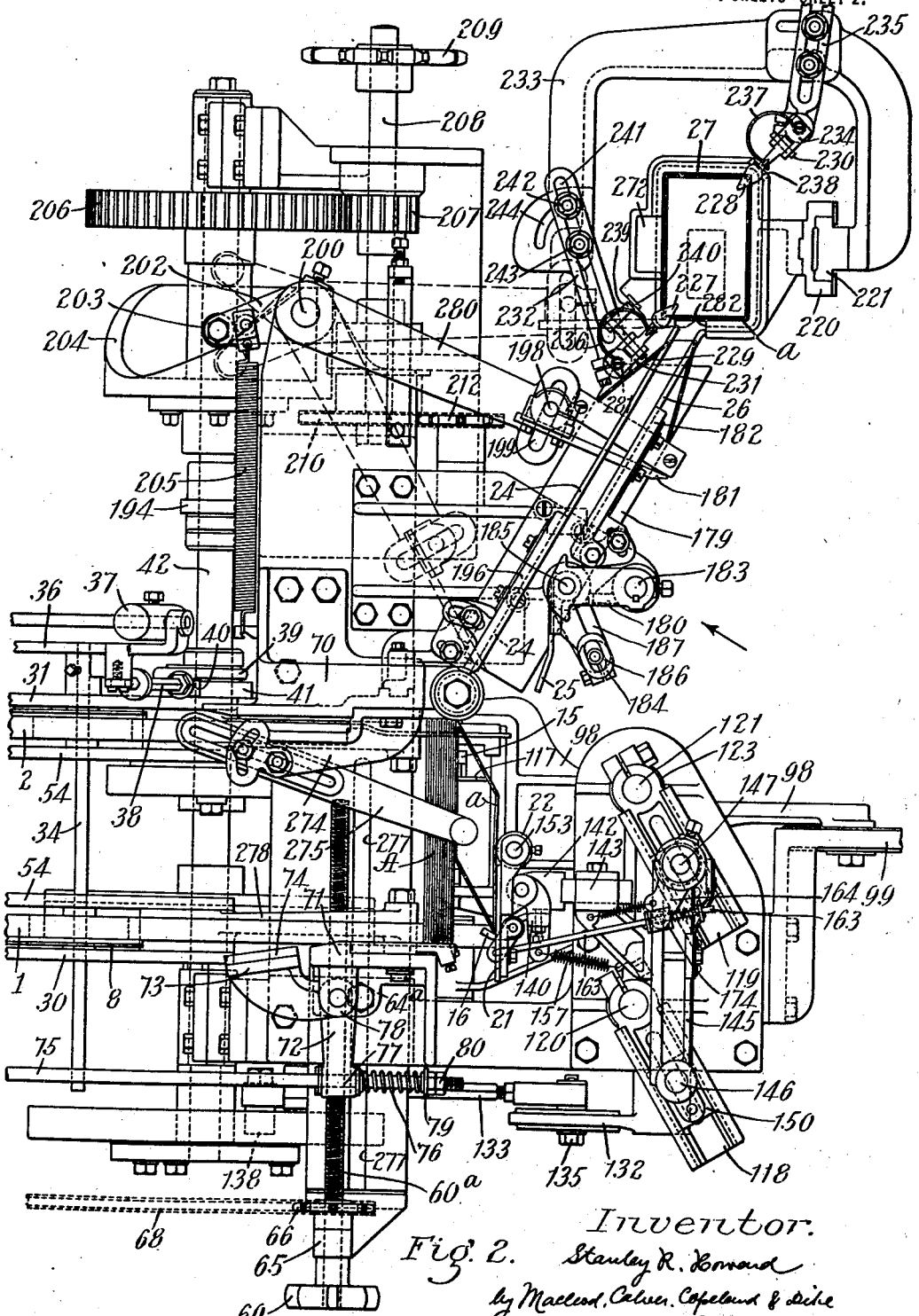
Fig. 2 is a plan view, the rear part of the machine being broken away.

There are two fingers 181, 181 one above the other, mounted on a vertical stud 198 carried by a horizontally oscillating arm 280 on the right hand side of the machine, somewhat back from the front of the machine as shown in Fig. 2. See Fig. 4. These fingers extend in behind the entrance to the passage between the two guide rails. One finger is above the lower fixed rail 24 and the other is above the upper fixed rail 24. The lower dotted position of the arm 280 and fingers 181 in Fig. 2 shows the position of the arm and fingers before the blank has entered between the guide rails. The operating mechanism will be more fully described hereinafter.

After the blank has entered between the guide rails the movable section 25 swings toward the opposite fixed rail 24 holding the blank against the fixed rail. This swings the back edge of the blank in against the fixed rail just ahead of the fingers 181. Inasmuch as the fingers 181 are in behind the rear edge of the blank, they will push the blank forward through the passage between the rails, and as the fingers 181 swing from the lower dotted position through the full line position into the upper dotted line position shown in Fig. 2, they will push the blank through the opening 282 in the side of the pocket 27 and carry it into the pocket.

The mechanism for operating the movable sections of the guide rails is as follows: A vertical stud 183 is mounted in a part of the frame and carries the two brackets 180, one some distance above the other, said brackets being forked at their outer ends, see Fig. 6. Each bracket 180 carries an arm 184 which is loosely mounted in the fork of the arm on a pin 185 on which the arm can swing. The movable sections 25 are secured to said arms 184, see Fig. 2. Each of these arms 184 is formed with a slot at its outer end through which passes a vertical pin 186, said pin being loose in said arms. The said pin 186 is mounted fast at its lower end in one end of a lever 187, the other end of said lever being made fast to a vertical shaft 188 which is journaled in a bearing 189 forming a part of the frame of the machine. The lower end of said shaft carries a bevel gear 190 which meshes with a bevel sector 191 mounted on a stud in the frame, said bevel sector having a downwardly extending arm 192 to the lower end of which is pivoted a connecting rod 193, see Figs. 6 and 4. Said connecting rod is operated by means of a cam 194 on the cam shaft 42, said cam being engaged by a roll 195 projecting from the connecting rod 193. The cam is so shaped that when the carton is folded over from the initial position to the second collapsed condition and just comes in contact with the feed roll 23, the movable sections 25 of the rails are open as shown in Figs. 2 and 13, but as soon as the carton is broken down completely into an approximately flat position, the movable sections of the rails are partially closed so that the opening between the outer end of each movable section and the stationary rail 24 is not much more than the width required to just put the carton through edgewise. After the carton has been entirely fed through from between the rolls 22 and 23, the movable rail section closes practically against the stationary rail.

The reason for requiring the swinging end of the movable rail section to move so far outward before the carton blank is admitted to the entrance between the guide rails is to permit the corner or folded edge of the blank along the line 20 (see Fig. 13) to clear the outer end of the movable rail when the blank swings around in the arc of a circle at the time it is folded over by the swinging of the oscillating folder members previously described.

The brackets 180 which carry the arms 184 to which the movable sections 25 of the rails are fastened also support brackets 182 to which are adjustably secured the stationary rail sections 26. The stationary rails 24 on the opposite side of the guide way are mounted on brackets 196 (see Fig. 2) very similar to the brackets which carry the stationary sections 26 on the first described side of the guide way. Said brackets 196 are supported from a position back of the feed roll 23 in order that there may be a clear and unobstructed space between the rails so that the fingers 181 which carry the blank through the guide way into the pocket of the sealing machine may be able to swing forward and back without any obstruction.

The blank moving fingers 181 and their operating mechanism will now be more fully described.

Figure 4:
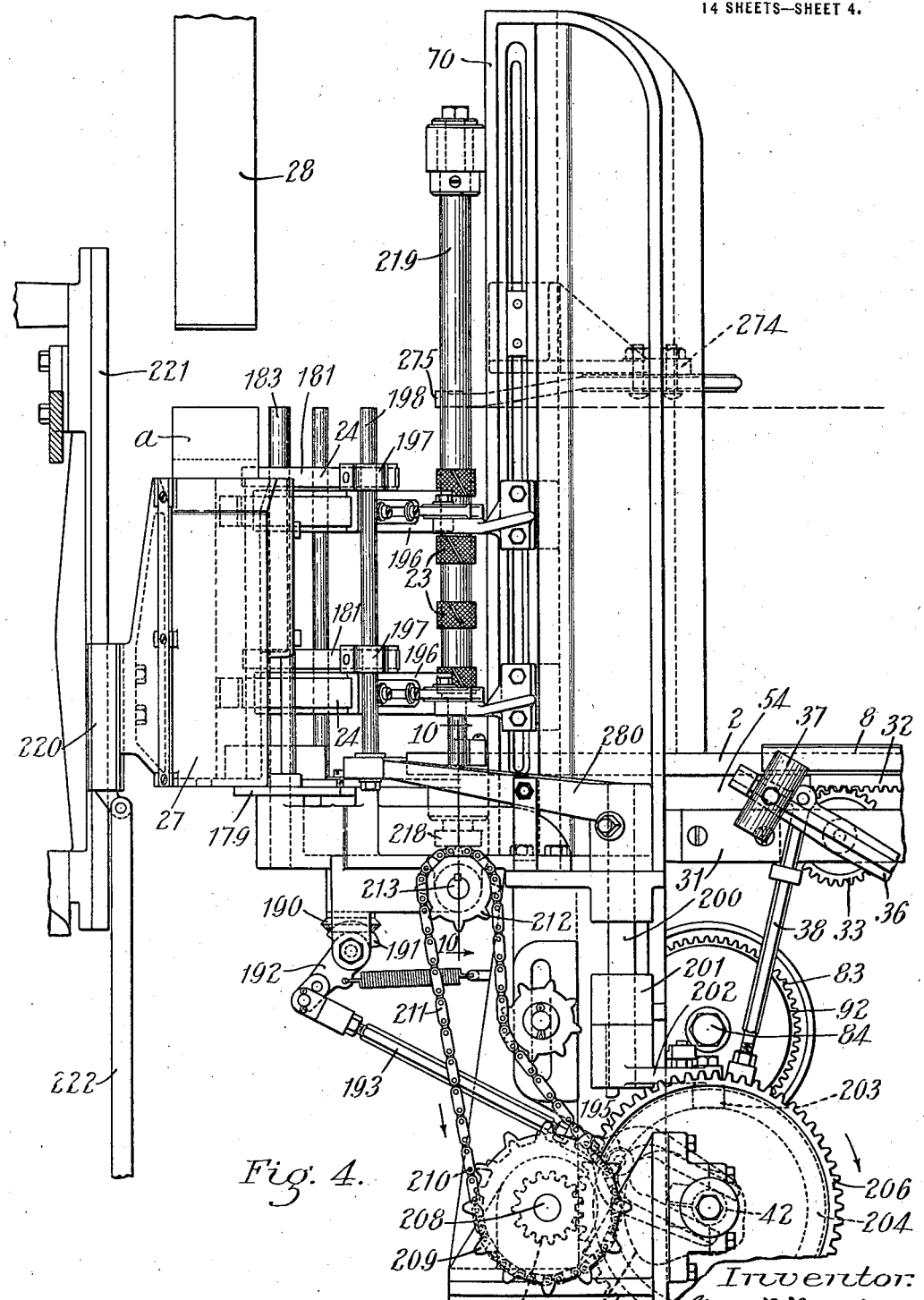
Fig. 4 is a right hand side elevation of the portion of the machine shown in Fig. 3, taken on the opposite side from Fig. 3.
Figure 5:
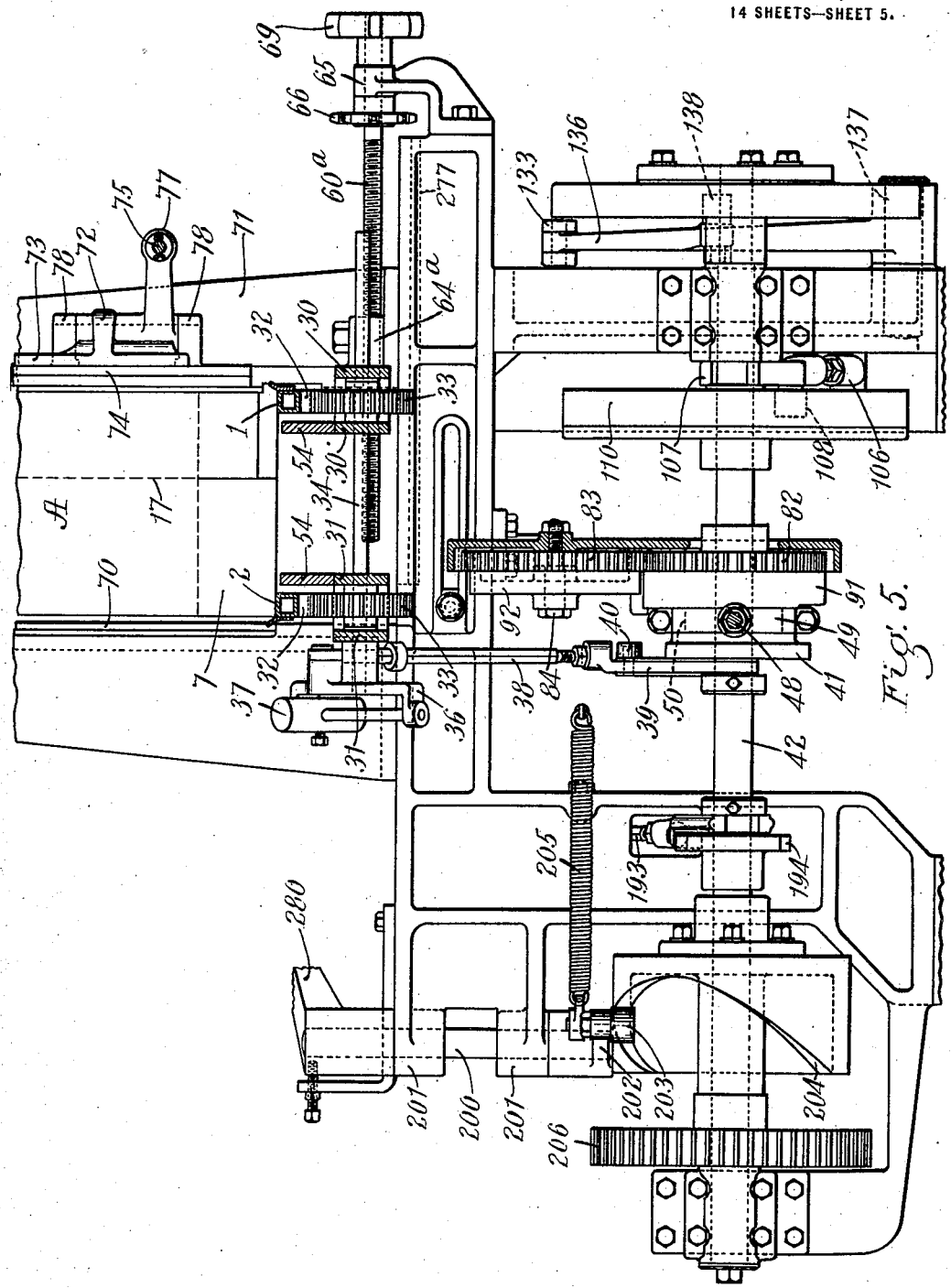
Fig. 5 is a rear elevation partly in section taken through the feed rails.
Figure 6:
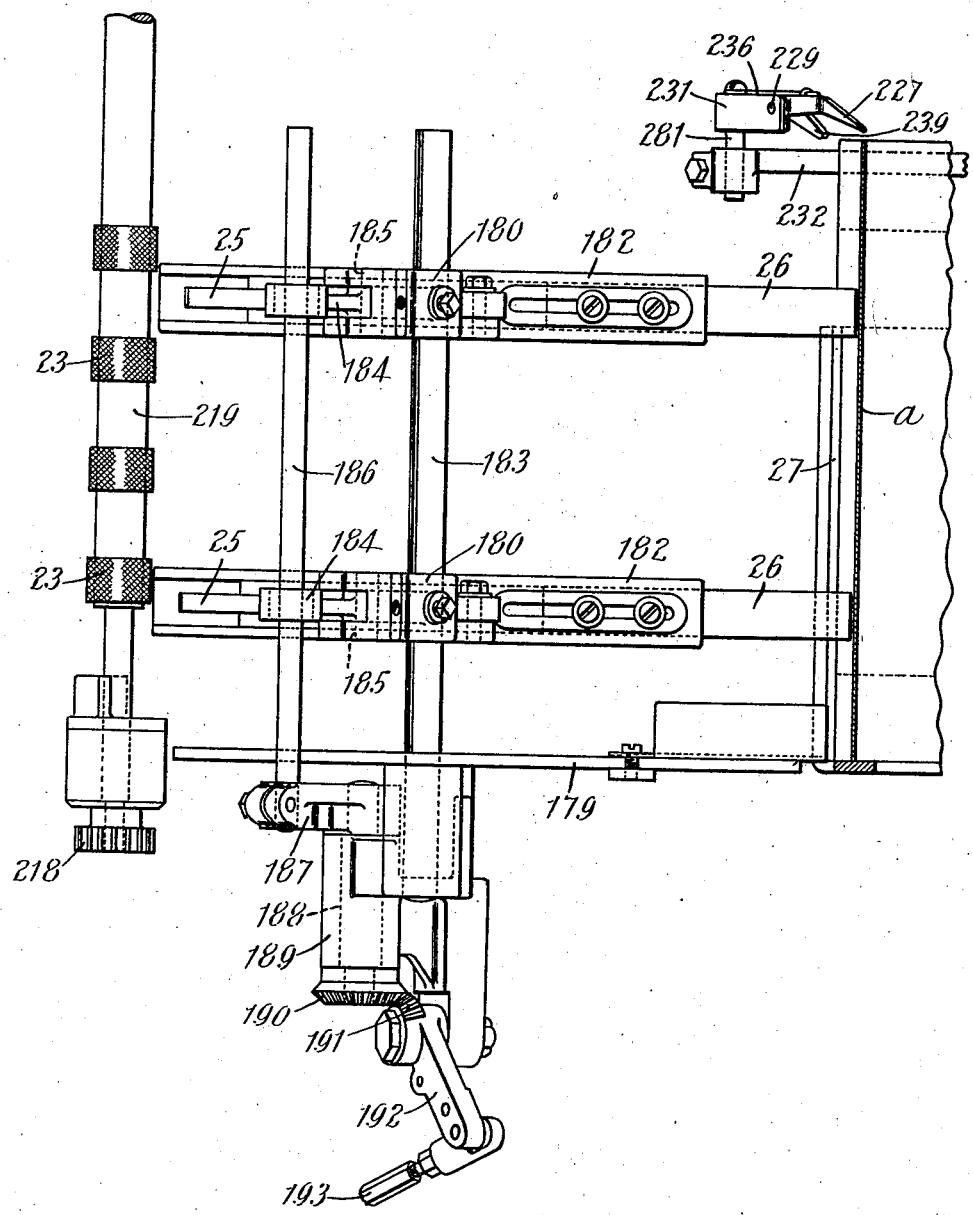
Fig. 6 is an elevation looking in the direction of the arrow in Fig. 2 from the front of the machine showing the guide rails and the parts more directly connected therewith, the other portions of the machine being omitted.

The fingers 181 are carried by holders 197 mounted, one at some distance above the other, on the vertical stud 198, the lower end of said stud being secured in a slot 199 in one end of an arm 280, see Figs. 2 and 4. The other end of said arm 280 is mounted fast on the upper end of a vertical rocker shaft 200. Said shaft 200 is journaled in bearings 201 in the frame of the machine. On the lower end of said vertical shaft is mounted a cam lever 202 which carries a roll 203, said roll being engaged by a barrel cam 204 on the cam shaft 42. The said roll is held in contact with the cam by means of a spring 205 which is attached at one end to the cam lever 202 and at the other end to a hook fast to the frame.

The cam shaft 42 is driven through a gear 206 which is mounted fast on said cam shaft 42. Said gear 206 meshes with a pinion 207 on the main driving shaft 208. Said shaft 208 carries a sprocket 209 (see Fig. 2) which is connected by a chain, not shown, to the cam shaft of the sealing machine, not shown, so that the blank feeding and opening mechanism will be driven in time with the sealing mechanism, and each mechanism will make one cycle of operation at the same time. The driving shaft 208 carries at its other end a sprocket 210 and said sprocket is connected by a chain 211 with a sprocket 212 on the end of the horizontal shaft 213, see Figs. 2, 4 and 10. Said horizontal shaft 213 is journaled in suitable bearings in the frame and carries at the opposite end from the sprocket 212 a bevel gear 214 which meshes with another bevel gear 215 mounted on the lower end of a vertical stud 216 mounted in the frame. Said bevel gear 215 has combined with it and moving therewith a spur gear 217 which meshes with the pinion 218 carried on the lower end of the vertical roll shaft 219, see Figs. 2, 4 and 10. Said roll shaft 219 carries on its upper end the feed roll 23 which draws a blank from the stack. The carton blank is moved along through the guide way between the rails by means of the fingers 181 which extend between the upper and lower rails, and said fingers are actuated through their intermediate connections by the arm 280 mounted on the shaft 200 and the barrel cam 204.

When the blank passes out from between the guide rails it is pushed by the said fingers 181 into the pocket 27, and by reason of the pressure of the fingers on the rear vertical folded edge of the blank, which will be the edge designated 17 on Fig. 13, the opposite folded edge 20 bearing against the opposite side of the pocket, the continued pressure of the advancing fingers 181 will open the carton blank to its fully squared out form in which shape it will be retained by the walls of the pocket.

At this point the carton blank is ready for the pocket to be raised upward and slide the carton on to the forming block 28 of the sealing machine, see Figs. 1 and 4. The pocket 27 is preferably formed of a casting made as light as possible and is carried on a slide 220 mounted on a vertical guide 221 (see Figs. 1 and 2) which is attached to the frame of the sealing machine. This slide is raised and lowered by means of a vertical connecting rod 222 and cam lever 223 which is connected with the lower end of said rod 222, said cam lever 223 having a roll 224 which engages with a cam groove 225 in a cam mounted on the shaft 226 of the sealing machine, see Fig. 1. The pocket 27 is thus moved up and down in a vertical direction.

In order that the upper ends of the flap of the carton shall not catch on the bottom of the forming block 28 as the carton is pushed up on the block, spreader fingers are provided to spread out the flaps. These spreader fingers are two in number, 227 and 228, located above two diagonally opposite corners of the pocket as shown in Fig. 2, and extend in a substantially horizontal direction. These spreader fingers are spoon shaped and are pivoted on pins 229 and 230 respectively. The pivot pin 229 of spoon 227 is mounted in a bracket 231 having a slotted arm 232 which is adjustably secured to a yoke shaped bracket 233. Said bracket 233 is attached to the guide 221 connected with the sealing machine.

The pivot pin 230 is mounted in a bracket 234 which is provided with a slotted arm 235 adjustably secured to a yoke shaped bracket 233.

As the pocket 27 rises and passes up by the fingers 227 and 228, said fingers will swing up into nearly a vertical position by the engagement of the side of the pocket with the fingers, and the finger 228 will be held in that position by the smooth flat edge 238 at that corner of the pocket (see Fig. 2) until the pocket descends and allows the fingers to resume their original position. At the left hand corner of the pocket over which the finger 227 extends, it is necessary that that corner should be left open in order that the carton may be pushed into the pocket. There is therefore no flat edge on that corner of the pocket similar to the flat edge 238 on the diagonally opposite corner to support the spreader finger after it has been turned into its upward position. In order to provide means for holding this finger in its upper position so that it will not catch on the corner of the pocket as the pocket descends, said finger 227 is mounted fast on its pivot stud 229, and on the outwardly extending end of said pivot 229 there is fastened an arm 239 which extends downwardly approximately in line with the point of the spreader finger and which is adapted to be engaged by a flat surface 240 on the pocket. By means of this contact between the arm 239 and the flat portion 240 of the pocket the finger is held in a raised position until the pocket descends. The finger 227 is provided with a spring 236 and the finger 228 is provided with a spring 237, said springs acting on the fingers to bring them back to their original normal position when the pocket descends.

The spreader finger 227 is mounted in a bracket 231 which is carried on a vertical stud 281. Said stud is clamped in one end of the horizontal bracket 232. This bracket 232 is provided with a long slot 241 through which two screws 242 and 243 pass. The screw 243 passes through the yoke shaped bracket 233, and the screw 242 passes through an arc shaped slot 244 in the bracket 233. By reason of the slot 241 in the bracket 232 this bracket may be moved forward and back in a longitudinal direction, and by reason of the arc shaped slot 244 in the bracket 233 the said bracket 232 may be rotated about the pivot point 243 while the said bracket 233 is attached to the main supporting bracket. By this means the spoon finger 227 may be moved into varying positions to accommodate cartons of different widths and thicknesses.

After the bracket 232 has been moved into approximately the correct position by means of the stud 281 in the forked bracket 231, the arm 232 may be rotated slightly to change the horizontal line of direction of the spoon finger 227 so that the vertical plane of rotation of the finger 227 when the carton is being lifted from the pocket will bisect the angle between the two flaps on which the spreader acts.

It will be obvious that by reason of the location of the spreader fingers 227 and 228 at diagonally opposite corners of the pockets one spreader finger will engage one of the side flaps and one of the narrow flaps, and the other finger will engage the other wide flap and narrow flap.

The forming blocks 28, which are preferably four in number, are hung from arms 270 which are mounted on a rotary shaft 271. Said shaft 271 is connected by suitable driving mechanism whereby it is given an intermittent movement to bring one of the forming blocks 28 in direct vertical alinement with the pocket 27 at each period of rest and it is also timed with relation to the driving mechanism for the feed and opening out movement to produce a period of movement in time for each blank that is squared out and deposited in the pocket. The vertical range of movement of the pocket is such that when the pocket rises it will telescope the inclosed carton onto the forming block. A spring clip 273 is mounted on one side of the forming block, and one side panel and connected top flap of the carton will slip up underneath the said spring 273. The pocket 27 is formed with a recess 272 in one side thereof to receive the spring 273 when the pocket rises so as not to interfere with its movement. On the downward movement of the pocket the spring 273 will clamp the carton against the forming block so that the carton will not be carried down with the pocket.

Sometimes the paper board of which the carton is made is so stiff and so slightly flexible that the spring stop 12 and the hook stop 14 as shown in Fig. 13 are not sufficient when used alone to resist the pressure and hold the foremost blank in its position in the stack until it is ready to be removed. The stiff paper board offers so much resistance to bend and break on the score line that there is not sufficient tension on the spring 12 on the left hand side of the stack to hold the blanks in position unless the spring is made too stiff to release the blank without tearing it when engaged by the fingers 16. For use in such cases a supplemental device has been employed as shown in Figs. 22, 23 and 24. This device consists of a finger which is adapted to be inserted into the side of the stack three or four blanks back from the front of the stack as shown in Fig. 23 so as to relieve the pressure on the blanks in front of the said separator finger. It is intended to still use the spring stop 12 shown in Fig. 13 to engage the front blank although said spring stop 12 is omitted from Figs. 22 and 23 to avoid confusion. This supplemental separator mechanism will now be described:

Fastened to the upright portion of the frame is a bracket 246. This bracket is forked at its end nearest the stack of cartons and carries at that end on a pin 247 a finger 248 which is pivoted between the branches of the said bracket, being formed with a point 249 which is adapted to enter between two of the blanks in the stack. This finger is provided with a recess in its back surface in which is seated a spring 250 the outer end of said spring being seated in a recess in the bracket 246. This spring is under tension and tends to press the finger 248 toward the stack of cartons as shown in Fig. 22 to separate several of the foremost blanks from those in the rear.

The slot 251 in the bracket 246 in which the finger 248 is located is of sufficient width so that alongside of said finger there is located a roll carrying arm 252 which is pivoted on a stud 253, said stud being mounted fast in the finger 248. The roll carrying arm 252 is provided with an arc shaped slot 254 through which passes the pin 247 upon which the finger 248 is pivoted, so that the roll carrying arm 252 may have a slight rocking movement on the stud 253 and on account of the arc shaped slot 254 may move freely over the pivot pin 247 of the finger 248, the range of such movement being limited by the length of the slot 254.

The finger 248 is provided with a right angle extension 255 which carries a threaded stud 256, said stud acting as a stop against the bracket 246 to locate the position of the finger 248 as the said finger is pushed forward into the stack of blanks by the action of the spring 250.

A bracket 257 is adjustably fastened upon the link beam 145 which forms a part of the oscillating combination which carries the opening plate 21, and is of angular shape and carries at its outer end a cam shaped finger 258 and a block 259 as shown in Fig. 22. On the forward movement of the opening plate 21, when said plate has opened the blank and recollapsed the blank on itself again as previously described, the cam shaped finger 258 will strike on the roll 260 mounted on the roll carrying arm 252 just before the end of the forward movement of the oscillating frame work and opening plate. This will at first turn the roll 260 on its pivot and the further movement will bring the side of the block 259 against the side of the roll 260. The continued sweep of the oscillating frame work, which, as will be understood, swings around in the arc of a circle, will cause the roller arm 252 to turn on its pivot and bring the roller arm and the finger 248 into the position shown in Fig. 23, withdrawing the finger 248 from between the blanks of the stack. At this time the finger 248 is completely withdrawn from the stack but the roll carrying arm 252 extends in front of the stack as shown in Fig. 3 and therefore takes up the pressure. This will not interfere with the action of the spring plate 12 because the spring plate will be located higher up or lower down on the side of the stack than the roll arm 252.

Upon the return movement of the oscillating frame work which carries the opening plate 21, the roll carrying arm 252 is allowed to withdraw to its original position and the finger 248 will again be pushed forward between two of the blanks in the stack ready for the next operation.

While the mechanism has been described as adapted to swing the two opposite side panels through an arc of 180° so that the original collapsed blank is again recollapsed into flat form, it is to be understood that the main object of this recollapsing is to break or weaken the spring so as to overcome the tendency to spring back from the squared out form. With some kinds of stock it may not be necessary to completely recollapse the blank to obtain the desired result. It is not therefore intended to limit the claims to a construction of mechanism which produces a complete recollapsing of the blank. The blank should, however, be at least partially recollapsed, that is, the swinging side panels should be moved over through and to some distance past a right angled relation to the other two panels.

In the machine shown and particularly described, the blanks are stood on end, and the reciprocable knife 15 which partially opens the blank has a vertical movement. The position, however, of the blanks and the plane of movement of the knife and also the plane of movement of the oscillating frame are all relative to each other. The knife should enter between the end flaps and it is obvious that the blanks might be stacked in vertical manner on rails by placing them on their side edges instead of on end. In such case the blade should move in a horizontal path instead of in a vertical path so as to enter between the front and rear end flaps of the blank, and in such case the oscillating frame should be arranged to oscillate in a vertical plane instead of in a horizontal plane.

When the blanks are spoken of as standing on edge, it is meant either on one of the side edges or on end, as distinguished from lying flat on one face.

What I claim is:

1. A reciprocable support for a pile of blanks, means for moving said support forward bodily with the blanks thereon, means for withdrawing the blanks successively from said support, means for moving the support backward and means whereby the actuating mechanism for the withdrawal of the blanks also controls the retrograde actuating mechanism to move said support backward after a predetermined forward movement of the support and a plurality of blanks have been withdrawn.

2. A reciprocable support for a pile of blanks, means for moving said support forward bodily with the blanks thereon, means for automatically withdrawing the blanks successively from said support, means for moving the support backward after a predetermined forward movement, means for freeing said support from the downward pressure of the stack during the retrograde movement of the support and means controlled by the mechanism for withdrawing the blanks from the stack to also control the retrograde actuating mechanism for the support and the mechanism for freeing the support from the pressure of the stack.

3. Mechanism for squaring out collapsed carton blanks formed with four side panels, said mechanism having in combination means for opening out a collapsed blank through and beyond a squared-out form, a rectangular pocket, means for transferring the recollapsed blank into the said pocket, and means for squaring out the recollapsed blank, said re-squaring-out mechanism consisting of presser mechanism coöperating with said pocket whereby the said presser mechanism engages one of the folded edges of the collapsed blank and presses the opposite folded edge against the inside of the pocket.

4. In combination with mechanism for squaring out collapsed carton blanks, a reciprocable support on which a stack of collapsed blanks stand in a row, each on edge one behind another, a stop which engages the forward blank of the stack, means which tend to move the support forward thereby holding the foremost blank of the stack against said forward stop, means for withdrawing one by one the blanks from the foremost end of the stack thereby permitting the support to move forward a distance sufficient to bring the next following blank into engagement with the stop, means for engaging the foremost blank of the stack and opening it out and folding it over beyond the squared out form, a rectangular pocket, means for transferring the recollapsed blank to said pocket, and means for squaring out the blank in said pocket.

5. In combination with mechanism for squaring out collapsed carton blanks, an underneath support adapted to hold the stack of collapsed blanks arranged one behind the other and standing on said support, means for removing the blanks from the stack successively for the squaring - out mechanism and means whereby after a blank is withdrawn the said underneath blank support together with the remainder of the stack of blanks standing thereon are moved forward to carry the foremost blank of said remaining portion of the stack to a predetermined position.

6. In combination with mechanism for squaring out collapsed carton blanks, an underneath support adapted to hold a stack of collapsed blanks arranged one behind the other and standing on said support, a stop for the forward blank of the stack, means for removing the blanks from the forward end of the stack one at a time for the squaring - out mechanism and means whereby after a blank is withdrawn the said underneath blank support and the remainder of the stack standing thereon are moved forward a distance sufficient to bring the next following blank into engagement with the stop.

7. In combination with mechanism for squaring out collapsed carton blanks, a reciprocable support for the blanks, means for withdrawing the blanks from the stack on the support for the squaring out mechanism, means for moving the blank support forward, means for freeing the stack of blanks from the said support after a predetermined number of blanks have been withdrawn therefrom, means for causing the support to move backward a predetermined distance when the stack has been freed, means for causing the stack to be redeposited on the support after the support has been given its retrograde movement, and means for controlling the relative times of movement of the blank removing mechanism, the squaring out mechanism, the support moving mechanism and the stack freeing mechanism.

8. A reciprocable support for a pile of blanks, means for moving said support bodily with the blanks thereon, means for automatically withdrawing the blanks successively from said support, means for moving the support backward after a predetermined forward movement and means for holding the stack against being carried backward by the said support.

9. A reciprocable support for a pile of blanks, means for moving said support bodily with the blanks thereon, means for automatically withdrawing the blanks successively from said support, means for moving the support backward after a predetermined forward movement, means for holding the stack against being carried backward by the said support and means controlled by the mechanism for withdrawing the blanks from the stack to also control the retrograde actuating movement of the support and the mechanism for preventing the stack from being moved backward with the support.

10. In a machine for opening up knock down carton blanks, a bottom support for a stack of blanks on which the blanks are supported one behind the other standing on edge in a row, and means for engaging the foremost collapsed blank on the said support and folding over two opposite side panels with relation to the rear panel of said blank while still on the holder by swinging said opposite side panels through an arc past a right angle with relation to the back panel and carrying the front panel with them by opening the blank out from the original collapsed form and recollapsing it.

11. In a machine for opening up knock down carton blanks, a bottom support for a stack of blanks on which the blanks are supported one behind the other standing on edge, means for engaging the foremost collapsed blank on the said support and folding over two opposite side panels with relation to the rear panel of said blank while still on the holder by swinging said opposite side panels past a right angle with relation to the back panel and carrying the front panel with them by opening the blank out from the original collapsed form and recollapsing it, squaring out mechanism, and means for transferring the recollapsed blank to the squaring out mechanism.

12. A machine for squaring out knock down carton blanks comprising a holder for a stack of blanks, stops which engage the foremost blank on opposite side edges thereof, and mechanism for engaging one side edge of the foremost blank while it is held against its stop and swinging it out from its stop while the opposite side edge is still held by its stop, and folding over two opposite side panels and the connecting front panel into recollapsed position.

13. A machine for squaring out knock down carton blanks comprising a holder for a stack of blanks, stops which engage the foremost blank on opposite side edges thereof, mechanism for engaging one side edge of the foremost blank while it is held against its stop and swinging it out from its stop while the opposite side edge is still held by its stop, and folding over two opposite side panels and the connecting front panel into recollapsed position, a separator and means which actuate said separator and said folding over mechanism in such relation to each other that the separator enters between two of the blanks in the stack at some distance back of the foremost blank, and thereby relieves the pressure of the body of the stack on the foremost blank during the opening-out movement.

14. A machine for squaring out knock down cartons comprising a support for a stack of cartons on edge, forward stops which engage the foremost blank in the stack near opposite side edges thereof, the stops which engage one edge being yielding and those on the other edge being rigid, means for maintaining the stack under pressure against said stops, mechanism for engaging one side edge of the foremost blank and swinging it out from the stops which engage that edge and opening out and folding over two opposite side panels and the connecting front panel into recollapsed position while the rear panel is held stationary, a separator located at one side of the stack, means which actuate the said separator and said folding over mechanism in such relation to each other that the separator enters between two of the blanks in the stack at some distance back of the foremost blank and thereby relieves the forward actuating pressure on the foremost blank before the opening out movement begins, and means for causing the withdrawal of the separator after the foremost blank has been removed to permit the succeeding blank to move forward.

15. A machine for squaring out knock down cartons comprising a support for a stack of cartons on edge, forward stops which engage the front of the foremost blank in the stack near the opposite side edges thereof, the stops which engage one edge being yielding and those on the other edge being rigid, means for maintaining the stack under pressure against said stops, mechanism for engaging one side edge of the foremost blank and swinging it out from the stops which engage that edge and opening out and folding over two opposite side panels and the connecting front panel into recollapsed position while the rear panel is held stationary, a separator located at one side of the stack, means which actuate the said separator and said folding over mechanism in such relation to each other that the separator enters between two of the blanks in the stack at some distance back of the foremost blank and thereby relieves the forward actuating pressure on the foremost blank before the opening out movement begins, means for causing the withdrawal of the separator after the foremost blank has been removed in order to allow a succeeding blank to move in front of the separator, and a movable supplemental front stop which engages the front face of the then foremost blank near one edge to resist the pressure of the stack while the said separator is being withdrawn.

16. A machine for squaring out knock-down cartons comprising a holder for a stack of folded cartons, mechanism for engaging the foremost carton and swinging two side panels and the front panel over to and past a squared-out form, a separator and means which actuate said separator and squaring out and folding over mechanisms in such relation to each other that the separator enters the stack at the rear of the foremost carton and relieves the pressure of the body of the stack on the foremost carton during said opening out operation.

17. A machine for squaring out knock-down cartons comprising a holder for a stack of knock-down cartons, stops for engaging the foremost carton, mechanism for engaging the foremost carton and swinging it out from the stop, a separator which enters the stack at the rear of the foremost carton and relieves the pressure of the body of the stack on the foremost carton during said swinging out operation on the foremost carton, means for causing the withdrawal of the separator after the foremost carton has been removed in order to allow a succeeding carton to move forward, and a movable supplemental stop which engages the then foremost carton to resist the pressure of the stack while the said separator is being withdrawn.

18. Mechanism for opening out and recollapsing a collapsed carton by swinging two opposite side panels and one of the intermediate panels so that the two side panels swing from collapsed position out through and beyond a right-angled position with relation to the other two panels, means for positively returning the recollapsed side panels back to a right-angled position, and means for positively retaining the re-squared-out carton in the squared form.

19. Mechanism for treating collapsed carton blanks comprising an oscillatable frame having members which engage one of the side edges of the blank at the fold, means for oscillating the frame in such a manner as to swing two opposite side panels and the connected front panel around through and beyond the squared-out position into a recollapsed position on the opposite side from the original, and a feed roll against which the recollapsed blank is pressed by the oscillating frame.

20. In combination with mechanism for squaring out collapsed carton blanks, means for holding the collapsed blanks on edge, an oscillatable frame having fingers which engage one of the folded side edges of the blank at the fold, means which oscillate said frame in a manner to cause said fingers to move through an arc of a circle and swing two opposite side panels and the connected front panel around through the squared out position and over beyond the squared out position into a recollapsed position on the opposite side from the original collapsed position, a feed roll against which the recollapsed blank is pressed by the oscillating frame, and means for transferring the recollapsed blank to the squaring out mechanism.

21. In combination with mechanism for squaring out collapsed carton blanks, a holder for a stack of collapsed blanks, means for folding over the foremost collapsed blank by swinging two opposite side panels through substantially 180° with relation to the rear panel and swinging the front panel together with said side panels and recollapsing the blank upon itself, means for transferring the recollapsed blank to the squaring out mechanism, said recollapsing mechanism consisting of an oscillating frame comprising two parallel arms, two vertical rocker shafts on which said arms are respectively mounted at one end thereof, a link having pivot connection with both of said arms, the distance from the center of each pivot to the center of the shaft on which the arms are respectively mounted being equal to the width of the panels to be folded over, fingers carried by said link which are adapted to engage with one of the side edges of the foremost carton in the stack, and means for actuating the rocker shafts on which said oscillating frame is mounted whereby the fingers which engage with the blank swing the two opposite side panels and the connected front panel through an arc, causing it to open out and recollapse upon itself while the back panel of the blank remains stationary.

22. In combination with mechanism for squaring out collapsed carton blanks, a holder for a stack of collapsed blanks, means for folding over the foremost collapsed blank by swinging two opposite side panels through substantially 180° with relation to the rear panel and swinging the front panel together with said side panels and recollapsing the blank upon itself, means for transferring the recollapsed blank to the squaring out mechanism, said recollapsing mechanism consisting of an oscillatable frame comprising two parallel arms, two vertical rocker shafts on which said arms are respectively mounted, a link having pivot connection with said arms, the distance between the center of each pivot of said link and the center of the shaft on which the arms are respectively mounted being equal to the width of the panels to be folded over, fingers carried by said oscillatable frame which are adapted to engage with one of the side edges of the foremost carton in the stack, means for actuating the rocker shafts on which said oscillating frame is mounted whereby the fingers which engage with the blank swing the two opposite side panels and the connected front panel through an arc causing it to open out and recollapse upon itself while the back panel of the blank remains stationary, a rotary feed roll, a presser member carried by said oscillating frame which presses the recollapsed blank against said feed roll and thereby causes the feed of the blank, guide ways between which the recollapsed blank is fed by said feed roll, and means for moving the blank along through said guide ways to the squaring out mechanism.

23. In combination with mechanism for squaring out collapsed carton blanks, a bottom support on which the collapsed blanks are supported on edge, one blank behind the other, a reciprocable knife, means for reciprocating said knife in such manner as to cause it to enter between the front and rear panels of the blank and partially open the blank, an oscillatable frame having fingers which engage one of the folded side edges of the partially opened blank at the fold, and means which oscillate said frame in a manner to cause said fingers to move through an arc of a circle and swing two opposite side panels and the connected front panel around through the squared out position and over beyond the squared out position into collapsed position on the opposite side from the original collapsed form.

24. In combination with mechanism for squaring out collapsed carton blanks, a bottom support on which the collapsed blanks are supported on edge, one blank behind the other, a reciprocable knife, means for reciprocating said knife in such manner as to cause it to enter between the front and rear panels of the blank and partially open the blank, an oscillatable frame having fingers which engage one of the folded side edges of the partially opened blank at the fold, means which oscillate said frame in a manner to cause said fingers to move through an arc of a circle and swing two opposite side panels and the connected front panel around through the squared out position and over beyond the squared out position into collapsed position on the opposite side from the original collapsed form, a rotary feed roll against which the recollapsed blank is pressed, a member carried by the oscillating frame which presses the recollapsed blank against said feed roll, guide ways between which the recollapsed blank is fed by said feed roll, means for moving the recollapsed blank through the passage between said guide ways, and means for squaring out the recollapsed blank to which the blank is delivered from said guide ways.

25. In combination with mechanism for squaring out collapsed carton blanks, a bottom support on which the collapsed blanks are supported on edge one blank behind the other, a vertically reciprocable knife, means for reciprocating said knife in such manner as to cause it to enter between the front and rear panels of the blank and partially open the blank, an oscillatable frame having fingers which engage one of the folded side edges of the partially opened blank at the fold, means which oscillate said frame in a manner to cause said fingers to move through an arc of a circle and swing two opposite side panels and the connected front panel around through the squared out position and over beyond the squared out position into collapsed position on the opposite side from the original collapsed form, a rotary feed roll against which the recollapsed blank is pressed, a member carried by the oscillating frame which presses the recollapsed blank against said feed roll, guide ways between which the recollapsed blank is fed by said feed roll, means for moving the recollapsed blank through the passage between said guide ways, a rectangular pocket into which the blank is delivered from said guide ways, and means for squaring out the blank in said pocket.

26. In combination with mechanism for squaring out collapsed carton blanks, a bottom support on which the collapsed blanks are supported on edge one blank behind the other, a reciprocable knife, means for reciprocating said knife in such manner as to cause it to enter between the front and rear panels of the blank and partially open the blank, an oscillatable frame having fingers which engage one of the folded side edges of the partially opened blank at the fold, means which oscillate said frame in a manner to cause said fingers to move through an arc of a circle and swing the two opposite side panels and the connected front panel around through the squared out position and over beyond the squared out position into collapsed position on the opposite side from the original collapsed form, a rotary feed roll against which the recollapsed blank is pressed by the oscillatable frame, guide ways between which the recollapsed blank is fed by said feed roll, means for moving the recollapsed blank through the passage between said guide ways, said guide ways comprising a fixed guide on one side and comprising on the other side a guide section which is movable toward and from said fixed guide section, and a stationary guide section between said movable guide section and the squaring out mechanism.

27. In combination with a forming block, a pocket in alinement with the forming block and shaped to the contour of the squared out carton blank, means for squaring out a carton blank in said pocket, and means for moving the pocket and blank held therein into telescopic connection with the outer face of the forming block.

28. In combination with a forming block, a reciprocable carton holding pocket in alinement with the forming block and shaped to hold a squared out blank, means for moving the pocket with the blank held therein to telescope the blank and pocket onto the outside of the forming block, and means for clamping the blank on the forming block to prevent its being withdrawn with the pocket on the retrograde movement of the pocket.

29. Mechanism for opening and squaring out collapsed carton blanks into tubular form, said mechanism comprising a pocket rectangular in cross section whose interior is shaped to the contour of the squared out blank, said pocket having a slot in one corner through which a collapsed blank may be inserted edgewise into the pocket, and means for pushing the blank through said slot into the pocket and pressing the folded edge of the blank which first enters the pocket against the inside corner of the pocket which is diagonally opposite said slot, until the blank is fully squared out in the pocket.

30. In a machine for squaring out collapsed carton blanks into tubular form, a pocket whose interior is shaped to the contour of the squared out blank, said pocket being formed with a slot between two adjacent walls of sufficient length and width for the admission of a collapsed blank edgewise through said slot into the interior of the pocket.

31. In combination with a forming block, a reciprocable carton blank holding pocket in alinement with the forming block and shaped to hold a squared out blank, means for moving the pocket with the squared out blank held therein toward the forming block and to slip the blank onto the forming block, means for withdrawing the pocket away from the forming block, and means for preventing the removal of the blank from the forming block when the pocket is withdrawn.

32. In combination with a forming block, a reciprocable carton blank holding pocket in alinement with the forming block shaped to hold a squared out blank, means for moving the pocket with the squared out blank held therein into telescopic relation to the forming block, fingers extending over the top of the pocket at two diagonally opposite corners thereof when the pocket is in its retracted position, each of said fingers being in a position to engage respectively two adjacent flaps of the blank when the pocket containing the blank moves toward the forming block, said fingers being yieldingly mounted under tension whereby the pressure of the fingers upon the ends of the flaps will spread the flaps outward when the pocket and blank move toward the forming block and in the continued movement of the pocket the pocket will engage said fingers and turn them back out of the path of the pocket.

33. In combination with mechanism for squaring out collapsed carton blanks, a bottom support on which the collapsed blanks are supported on edge, means for withdrawing a blank from the support and opening it out and recollapsing it by turning two opposite side panels through an angle of substantially 180°, a squaring out pocket for the blank, means for transferring the recollapsed blank to the pocket, means for squaring out the blank in said pocket, a forming block shaped to the interior of the squared out blank located in alinement with the pocket, means for moving the pocket and the opened out blank and slipping it onto said forming block, and hinged fingers located above two diagonally opposite corners of the pocket and extending into the path of movement of the blank during its movement so constructed and arranged that each finger will engage two adjacent flaps of the blank and spread them out during the movement of the pocket, the said fingers being turned back on their hinges by engagement with the edges of the pocket.

34. In combination with a forming block, a reciprocable carton blank holding pocket in alinement with the forming block shaped to hold a squared out blank, means for moving the pocket with the squared out blank held therein into telescopic relation to the forming block, fingers extending over the top of the pocket at two diagonally opposite corners thereof when the pocket is in its retracted position, each of said fingers being in a position to engage respectively two adjacent flaps of the blank when the pocket containing the blank moves toward the forming block, said fingers being yieldingly mounted under tension whereby the pressure of the fingers upon the ends of the flaps will spread the flaps outward when the pocket moves toward the forming block and whereby in the continued movement of the pocket, the pocket will engage said fingers and turn them back out of the path of the pocket, and means for adjusting said fingers to varying sized carton blanks so that they will respectively bisect the angle formed by two adjacent end flaps.

35. Mechanism for squaring out collapsed carton blanks comprising a rectangular pocket of the contour of the squared-out blank and having an opening in one side, means for inserting the collapsed blank edgewise into the pocket and means for pressing against one of the folded side edges of the blank and thereby pressing the opposite folded edge against the inside of the pocket opposite the entrance to open the folded blank into the squared-out form within the walls of the pocket.

36. Mechanism for squaring out collapsed carton blanks comprising a rectangular pocket of the contour of the squared-out blank and having a narrow entrance opening in one side, a guideway having a narrow passage leading to said entrance to the pocket, and means for automatically moving a collapsed blank edgewise through said guideway and entrance opening into the pocket.

37. Mechanism for squaring out collapsed carton blanks comprising a rectangular pocket of the contour of the squared-out blank and having a narrow entrance opening in one side, a guideway having a narrow passage leading to said entrance to the pocket, means for automatically moving a collapsed blank edgewise through said guideway and entrance opening into the pocket, and means for pressing on the rear folded edge of the blank while the advance edge of the blank engages the wall of the pocket opposite the said entrance, to open the folded blank into the squared-out form.

38. A machine for squaring out collapsed carton blanks comprising mechanism for opening out a collapsed blank and recollapsing it on the opposite side, squaring out mechanism and guideways between which the recollapsed blank is fed to the squaring out mechanism, and means for feeding the blank between said guideways, said guideways comprising a fixed guide on one side and a two-part guide on the other side, a portion of said two-part guide being movable toward and from said fixed guide and the other portion being stationary.

39. In combination with a forming block, a pocket in alinement with the forming block to hold a squared-out carton blank, and means for moving the pocket with the squared-out blank held therein into telescopic relation with the forming block, and thereby slip the carton onto the outside of the forming block.

40. In combination with a forming block, a pocket in alinement with the forming block to hold a squared-out carton blank, means for moving the pocket with the squared-out blank held therein to telescope the pocket and the blank held therein onto the outside of the forming block, and means for withdrawing the pocket away from the carton while the carton remains upon the forming block.

41. In combination with a forming block, a pocket in alinement with the forming block to hold a squared-out blank, means for moving the pocket with the squared-out blank held therein into telescopic relation with the forming block, and hinged fingers located above two diagonally opposite corners of the pocket extending into the path of movement of the blank and so constructed and arranged that each finger will engage two adjacent flaps of the blank and spread them out during the movement of the pocket and blank, the said fingers being adapted to be turned back on their hinges by engagement with the edges of the pocket.

42. Mechanism for treating collapsed carton blanks by swinging two opposite side panels from a collapsed position out through and beyond a right-angled position, said mechanism consisting of an oscillating frame having two parallel arms, two rocker shafts on which said arms are respectively mounted, a link having pivot connection with both of said arms, the d stance from the center of each pivot to the center of the shaft on which the arms are respectively mounted being equal to the width of the panels to be folded over, members carried by said link which are adapted to engage with one of the side edges of the foremost blank in the stack, and means for actuating the rocker shafts on which said oscillating frame is mounted, whereby the members which engage the blank swing the two opposite side panels and the connecting front panel through an arc, causing it to open out and recollapse upon itself.

43. Mechanism for treating collapsed carton blanks by swinging two opposite side panels from a collapsed position out through and beyond a right-angled position, said mechanism consisting of an oscillating frame having two parallel arms, two rocker shafts on which said arms are respectively mounted, a link having pivot connection with both of said arms, the distance from the center of each pivot to the center of the shaft on which the arms are respectively mounted being equal to the width of the panels to be folded over, members carried by said link which are adapted to engage with one of the side edges of the foremost blank in the stack, and means for actuating the rocker shafts on which said oscillating frame is mounted, whereby the members which engage the blank swing the two opposite side panels and the connecting front panel through an arc, causing it to open out and recollapse upon itself, a rotary feed roll and a pressure member carried by said oscillating frame which presses the recollapsed blank against said feed roll and thereby causes the feed of the blank, and squaring out mechanism to which the blank is fed by said feed roll.

In testimony whereof I affix my signature.

STANLEY R. HOWARD.